(12) United States Patent
Fujita et al.

(10) Patent No.: US 12,491,627 B2
(45) Date of Patent: Dec. 9, 2025

(54) INFORMATION PROCESSING APPARATUS AND COOKING SYSTEM

(71) Applicant: Sony Group Corporation, Tokyo (JP)

(72) Inventors: Masahiro Fujita, Tokyo (JP); Michael Spranger, Tokyo (JP); Kenta Kawamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 274 days.

(21) Appl. No.: 18/035,299

(22) PCT Filed: Oct. 5, 2021

(86) PCT No.: PCT/JP2021/036876
§ 371 (c)(1),
(2) Date: May 4, 2023

(87) PCT Pub. No.: WO2022/102287
PCT Pub. Date: May 19, 2022

(65) Prior Publication Data
US 2023/0405808 A1    Dec. 21, 2023

(30) Foreign Application Priority Data

Nov. 11, 2020 (JP) ................................. 2020-188272

(51) Int. Cl.
*B25J 9/16* (2006.01)
(52) U.S. Cl.
CPC ................................. *B25J 9/1602* (2013.01)

(58) Field of Classification Search
None
See application file for complete search history.

(56) References Cited

U.S. PATENT DOCUMENTS

| 2004/0172380 | A1* | 9/2004 | Zhang | B25J 9/1682 |
| 2004/0189675 | A1* | 9/2004 | Pretlove | G06F 3/1454 |
| | | | | 348/E7.087 |
| 2010/0107785 | A1* | 5/2010 | Kugimiya | G01N 27/327 |
| | | | | 73/865.7 |

(Continued)

FOREIGN PATENT DOCUMENTS

| JP | 2002-077444 A | 3/2002 |
| JP | 2007-155825 A | 6/2007 |

(Continued)

OTHER PUBLICATIONS

International Search Report and Written Opinion mailed on Dec. 21, 2021, received for PCT Application PCT/JP2021/036876, filed on Oct. 5, 2021, 9 pages including English Translation.

*Primary Examiner* — Adam R Mott
*Assistant Examiner* — Alan Lindsay Ostrow
(74) *Attorney, Agent, or Firm* — XSENSUS LLP

(57) ABSTRACT

An information processing apparatus according to an embodiment of the present disclosure includes: a flavor presentation unit that generates data for presenting, to a user who is present in a first space, a flavor of a cooking object that is present in a second space, the second space being separated from the first space; and an instruction generator that generates, on a basis of an input from the user, a control instruction for controlling an action of a cooking robot that is present in the second space.

18 Claims, 18 Drawing Sheets

(56) References Cited

U.S. PATENT DOCUMENTS

| | | | | |
|---|---|---|---|---|
| 2015/0290795 A1* | 10/2015 | Oleynik | ................. | B25J 9/0081 |
| | | | | 700/257 |
| 2016/0059412 A1* | 3/2016 | Oleynik | ................. | G05B 19/42 |
| | | | | 700/250 |
| 2019/0082722 A1* | 3/2019 | Sakaki | ....................... | G06T 7/50 |
| 2020/0086482 A1* | 3/2020 | Johnson | ................. | B25J 9/1653 |
| 2021/0308865 A1* | 10/2021 | Lin | ........................ | B25J 9/1651 |

FOREIGN PATENT DOCUMENTS

| | | |
|---|---|---|
| JP | 2009-172721 A | 8/2009 |
| JP | 2020-075301 A | 5/2020 |
| JP | 2020-075302 A | 5/2020 |
| JP | 2020-175471 A | 10/2020 |
| WO | 2020/179401 A1 | 9/2020 |

* cited by examiner

INFORMATION PROCESSING APPARATUS AND COOKING SYSTEM

CROSS-REFERENCE TO RELATED APPLICATIONS

The present application is based on PCT filing PCT/JP2021/036876, filed Oct. 5, 2021, which claims priority to Japanese Application No. 2020-188272, filed Nov. 11, 2020, the entire contents of each are incorporated herein by reference.

TECHNICAL FIELD

The present disclosure relates to an information processing apparatus and a cooking system.

BACKGROUND ART

With recent development of sensing technology and robot technology, a proposition has been made that a user operates a robot that is present at a remote location and causes the robot to perform work at the remote location (for example, see PTLs 1 and 2).

CITATION LIST

Patent Literature

PTL 1: Japanese Unexamined Patent Application Publication No. 2020-75301
PTL 2: Japanese Unexamined Patent Application Publication No. 2020-75302

SUMMARY OF THE INVENTION

In such a case, a user is presented with various pieces of information acquired by a visual sensor, an auditory sensor, and a force/tactile sensor that are present at a remote location in terms of a visual sense, an auditory sense, and a force/tactile sense, respectively, and is thus able to obtain a sense as if the user actually goes to the remote location and performing an operation.

Accordingly, in a case of causing the user to remotely operate a robot, there has been a demand for presenting more pieces of sense information to the user. In particular, in a work where a quality of a deliverable is strongly dependent on a sense of the user, it is desirable to present to the user information regarding other senses in addition to the visual sense, the auditory sense, and the force/tactile sense.

It is desirable to provide an information processing apparatus and a cooking system that are able to present, to a user who operates a robot that is present at a remote location, more pieces of sense information than those sensed at the remote location.

An information processing apparatus according to an embodiment of the present disclosure includes: a flavor presentation unit that generates data for presenting, to a user who is present in a first space, a flavor of a cooking object that is present in a second space, the second space being separated from the first space; and an instruction generator that generates, on a basis of an input from the user, a control instruction for controlling an action of a cooking robot that is present in the second space.

A cooking system according to an embodiment of the present disclosure includes: a sensing unit that senses a flavor of a cooking object that is present in a second space; a flavor presentation unit that generates data for presenting the sensed flavor of the cooking object to a user who is present in a first space, the first space being separated from the second space; an instruction generator that generates a control instruction on a basis of an input from the user; and a cooking robot whose action is controlled on a basis of the control instruction, the cooking robot cooking the cooking object that is present in the second space.

According to the information processing apparatus of the embodiment of the present disclosure and the cooking system of the embodiment of the present disclosure, the data for presenting the flavor of the cooking object that is present in the second space to the user who is present in the first space separated from the second space is generated, and the control instruction for controlling the action of the cooking robot that is present in the second space is generated on the basis of the input of the user. Accordingly, it is possible, for example, for the user who is present in the first space to grasp the flavor of the cooking object that is present in the second space separated from the first space.

MODES FOR CARRYING OUT THE INVENTION

Figure 1:
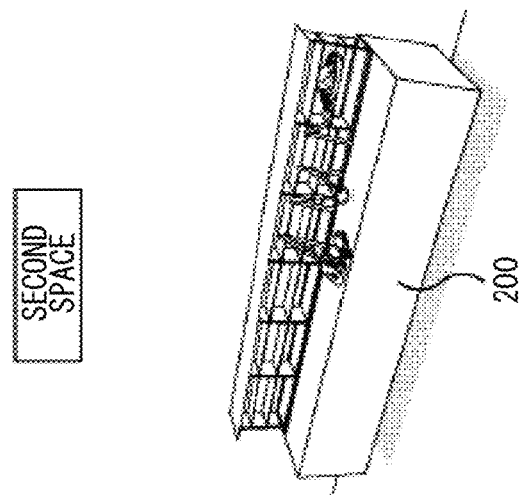
FIG. 1 is an explanatory diagram illustrating an outline of a cooking system according to a first embodiment of the present disclosure.
Figure 1:
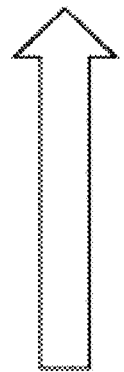
Figure 1:
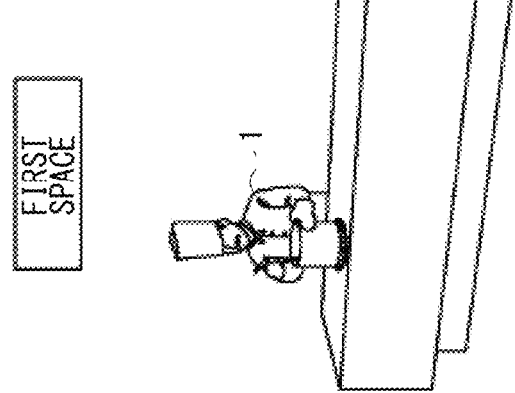

The following describes embodiments of the present disclosure in detail with reference to the drawings. The following description is a specific example of the present disclosure, but the present disclosure is not limited to the following embodiments. In addition, the present disclosure is not limited to arrangement, dimensions, dimensional ratios, and the like of the constituent elements illustrated in the drawings.

It is to be noted that description is given in the following order.

1. First Embodiment
1.1. Outline
1.2. Configuration Example
1.3. Modification Example
2. Second Embodiment
2.1. Configuration Example
2.2. Action Example
3. Third Embodiment
3.1. Configuration Example
3.2. Action Example
4. Fourth Embodiment
4.1. Outline
4.2. Configuration Example
4.3. Modification Example
5. Hardware Configuration Example

1. First Embodiment

1.1. Outline

Figure 2:
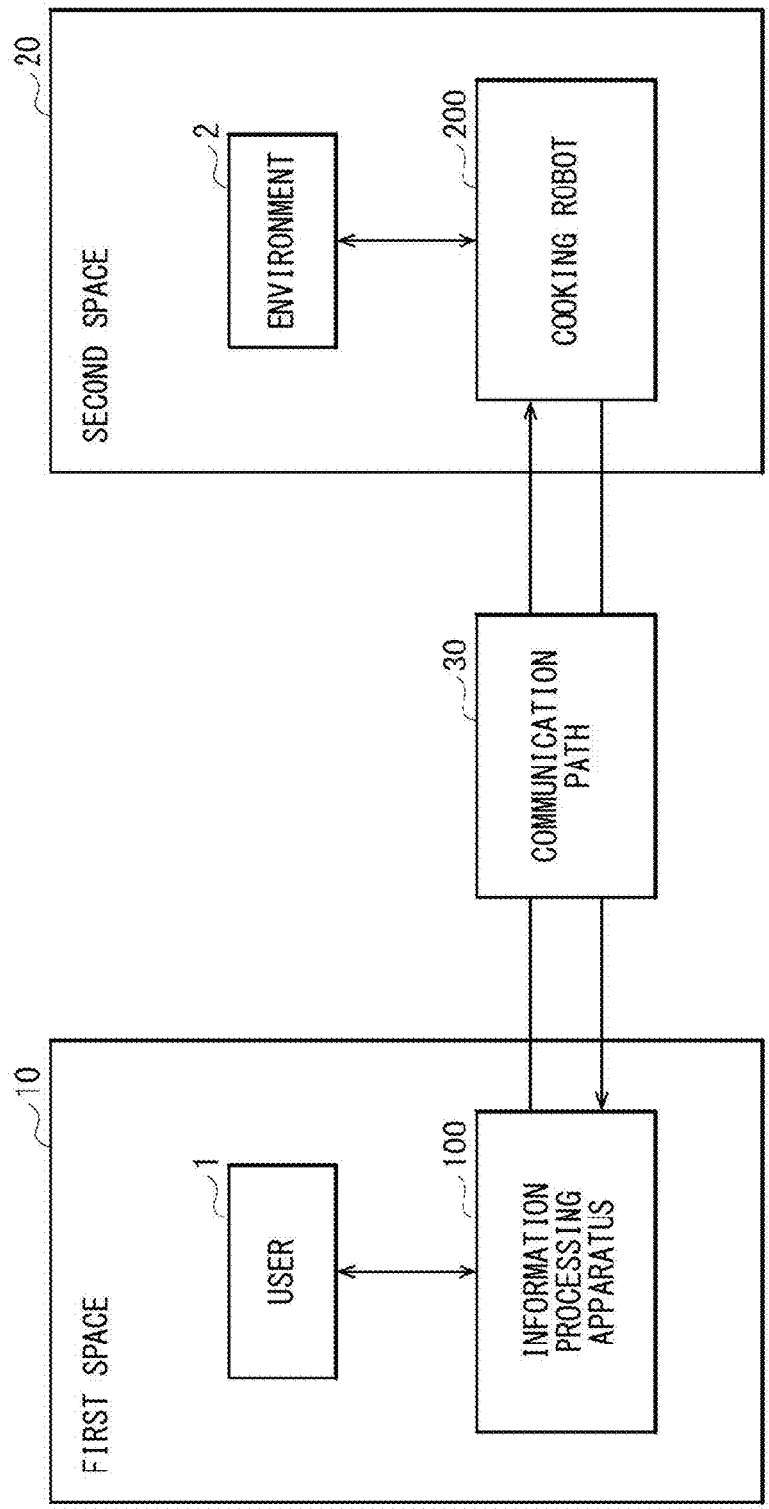
FIG. 2 is a block diagram illustrating a configuration of the cooking system according to the same embodiment.

First, referring to FIGS. 1 and 2, an outline of a cooking system according to a first embodiment of the present disclosure will be described. FIG. 1 is an explanatory diagram illustrating the outline of the cooking system according to the present embodiment. FIG. 2 is a block diagram illustrating a configuration of the cooking system according to the present embodiment.

As illustrated in FIG. 1, the cooking system according to the present embodiment is a system for a user (a cook) 1 who is present in a first space to remotely operate a cooking robot 200 that is present in a second space to perform cooking.

Specifically, as illustrated in FIG. 2: in a first space 10, the user 1 and an information processing apparatus 100 are present; and in a second space 20 that is separated from the first space 10, the cooking robot 200 and an environment 2 are present. The information processing apparatus 100 in the first space 10 and the cooking robot 200 in the second space 20 are communicably coupled to each other via a communication path 30.

The user 1 is a cook or the like who remotely operates the cooking robot 200 that is present in the second space 20 separated from the first space 10.

The information processing apparatus 100 generates, on the basis of an operation input from the user 1, a control instruction including a position, a velocity, and a force necessary for an action of the cooking robot 200, and transmits the generated control instruction to the cooking robot 200 via the communication path 30.

The user 1 is able to obtain a sense as if the user were in the second space 20 by being presented with information, which is acquired by a visual sensor, an auditory sensor, and force/tactile sensor that are provided around the cooking robot 200 in the second space 20, in terms of a visual sense, an auditory sense, and a force/tactile sense. For example, the information processing apparatus 100 may use a head mounted display to present the information obtained by the visual sensor to the user 1, or may use headphones to present the information obtained by the auditory sensor to the user 1. Further, the information processing apparatus 100 may use a dome-shaped screen to present the information obtained by the visual sensor to the user 1, or may use a surround speaker to present the information obtained by the auditory sensor to the user 1. In such cases, the information processing apparatus 100 is able to present the auditory information and the visual information of the more faithfully reproduced second space 20 to the user.

The operation input from the user 1 may be performed by a commonly used input device such as a mouse, a keyboard, a touch panel, a button, a switch, or a lever. Further, the operation input from the user 1 may be performed by acquiring a motion of the user 1 by a mechanism (e.g., an exoskeleton) attached to the user 1. In addition, the operation input from the user 1 may be performed by estimating an attitude and a motion of the user 1 on the basis of an image of the user 1 or a marker attached to the user 1. That is, the cooking robot 200 may be operated by the motion being directly inputted by the user 1, and may be operated to trace the motion of the user 1 on the basis of a sensing result of the motion of the user 1.

The environment 2 includes an ingredient to be cooked by the cooking robot 200, a cooking utensil to be used for cooking to be performed by the cooking robot 200, and a kitchen which is a place where the cooking is to be performed by the cooking robot 200.

The cooking robot 200 is able to complete a dish or the like by operating the cooking utensil included in the environment 2 to cook the ingredient on the basis of the control instruction transmitted from the information processing apparatus 100. The cooking robot 200 may be, for example, a humanoid robot including legs and arms, or a robotic arm device including only arms.

The cooking robot 200 may include a visual sensor, an auditory sensor, and a force/tactile sensor for sensing the environment 2. Visual information, auditory information, and force/tactile information acquired by the visual sensor, the auditory sensor, and the force/tactile sensor are transmitted to the information processing apparatus 100 via the communication path 30, and are presented to the user 1. It is to be noted that the visual sensor, the auditory sensor, and the force/tactile sensor may be provided outside the cooking robot 200 as long as they are able to sense the information of the environment 2.

The communication path 30 is able to transmit and receive data via a wired or wireless communication network such as an Internet communication network, a LAN (Local Area Network), an infrared communication network, a radio wave communication network, or a satellite communication network. The communication path 30 is able to transmit and receive data to and from each other between the first space 10 and the second space 20 that are separated from each other.

In the cooking system according to the present embodiment, the information processing apparatus 100 obtains information related a flavor, and presents the acquired information related the flavor to the user 1. The information related the flavor includes at least one or more of a taste, a scent, or a texture, of the ingredient, the ingredient being cooked, or a dish obtained by cooking the ingredient included in the environment 2 in the second space 20 (hereinafter, may be collectively referred to as cooking object). This allows the user 1 to more intentionally adjust the flavor of the dish completed through a cooking process.

In particular, the cooking is a work in which it is difficult to reproduce the same flavor even if the cooking goes through the same process, due to variations in the ingredient or the like. Further, the cooking is a work in which a flavor such a taste, a scent, or a texture of the completed dish is controlled by a sense of the user 1 who operates the cooking robot 200. Accordingly, the information processing apparatus 100 presents the flavor of the ingredient sensed in the second space 20 to the user 1 who is present in the first space 10, to thereby make it possible for the user 1 to control the cooking robot 200 in such a manner that the flavor of the completed dish is a flavor intended by the user 1.

1.2. Configuration Example

Figure 3:
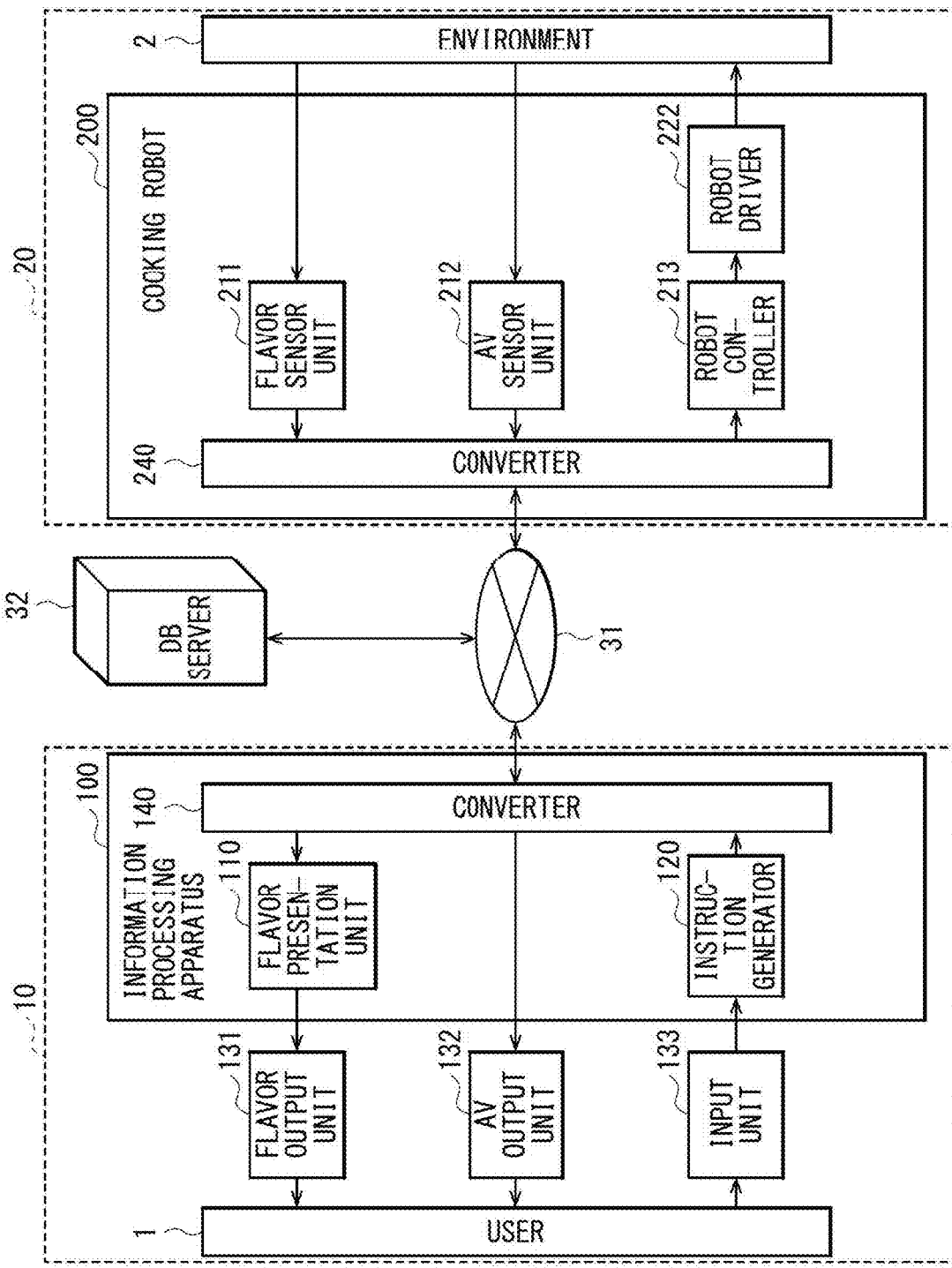
FIG. 3 is a block diagram illustrating an example of a more specific configuration of the cooking system according to the same embodiment.

Next, referring to FIG. 3, a configuration example of the cooking system according to the present embodiment will be described in detail. FIG. 3 is a block diagram illustrating an example of a more specific configuration of the cooking system according to the present embodiment.

As illustrated in FIG. 3, the cooking system according to the present embodiment includes: the user 1, a flavor output unit 131, an AV output unit 132, an input unit 133, and the information processing apparatus 100 on a first space 10 side; and the cooking robot 200 and the second space 20 on a second space 20 side.

The information processing apparatus 100 and the cooking robot 200 are communicably coupled to each other via a network 31. Further, the network 31 may be coupled to a DB server 32 that stores a database that is referred to when the cooking robot 200 performs cooking.

First Space 10 Side

As described above, the user 1 is a cook or the like. The user 1 is able to perform cooking using an ingredient or the like included in the environment 2 by operating in the first space 10 the cooking robot 200 that is present in the second space 20.

The input unit 133 is a device that receives the operation input from the user 1. The operation input from the user 1 acquired by the input unit 133 is outputted to an instruction generator 120 of the information processing apparatus 100.

For example, the input unit 133 may include a commonly used input device such as a mouse, a keyboard, a touch panel, a button, a switch, or a lever that accepts a direct operation from the user 1 to the cooking robot 200. Alternatively, the input unit 133 may include a detection device that detects a motion of the user 1 as an action to be traced by the cooking robot 200. For example, the input unit 133 may include a detection device that detects a motion of the user 1 by a mechanism attached to the user 1, and may include an imaging device that detects the motion of the user 1 by a marker or image recognition.

In a case where the input unit 133 includes the detection device that detects the motion of the user 1 by the mechanism attached to the user 1, the input unit 133 may be configured to, when receiving the operation input from the user 1, return a reaction force such as a force or a vibration to the user 1. In such a case, the input unit 133 is able to give the user 1 a sense as if the user 1 were actually experiencing the action of the cooking robot 200, thus making it possible to give the user 1 realistic sensations. A technique for returning feedback to skin sensation by returning the reaction force to the user 1 is also referred to as a haptic technique.

The AV output unit 132 outputs an image and a sound of the environment 2 acquired by an AV sensor unit 212 in the second space 20 to the user 1. That is, the AV output unit 132 is an output device that presents visual information and auditory information acquired in the second space 20 to a visual sense and an auditory sense of the user 1.

For example, as a device that presents the visual information acquired by the AV sensor unit 212 in the second space 20 to the visual sense of the user 1, the AV output unit 132 may include a display device such as an LCD (Liquid Crystal Display), a PDP (Plasma Display Panel), an OLED (Organic Light Emitting Diode) display, a hologram, a projector, or an HMD (Head Mounted Display). Further, as a device that presents the auditory information acquired by the AV sensor unit 212 in the second space 20 to the auditory sense of the user 1, the AV output unit 132 may also include a sound output device such as a speaker or a headphone. In order to present more realistic visual information or auditory information to the user 1, the AV output unit 132 may be configured to include an HMD and surround headphones to be used in a VR (Virtual Reality) technique and the like.

The flavor output unit 131 outputs a flavor of a cooking object acquired by a flavor sensor unit 211 in the second space 20 to the user 1. Specifically, the flavor output unit 131 may include a taste output unit that reproduces a taste of the cooking object and presents the taste to the user 1, a scent output unit that reproduces a scent of the cooking object and presents the scent to the user 1, and a texture output unit that reproduces a texture of the cooking object and presents the texture to the user 1.

For example, the taste output unit may present the taste of cooking object to the taste sense of the user 1 by electrically stimulating the tongue of the user 1 using a gel electrode.

Specifically, the taste output unit includes: a first electrode group including an electrode that includes sodium chloride and causes saltiness to be felt, an electrode that includes citric acid and causes sourness to be felt, an electrode that includes magnesium chloride and causes bitterness to be felt, an electrode that includes glycine and causes sweetness to be felt, and an electrode that includes glutamic acid and causes umami to be felt; and a second electrode group that is a counter electrode of the first electrode group that stimulates the taste sense. The taste output unit may form an electric circuit with the user 1 by bringing the first electrode group that stimulates the taste sense into contact with the tongue of the user 1, and bringing the second electrode group into contact with the hand or the like of the user 1. Accordingly, the taste output unit is able to control the respective intensities of the saltiness, the sourness, the bitterness, the sweetness, and the umami felt by the tongue of the user 1 by controlling the amounts of current flowing through the respective electrodes of the first electrode group. The taste output unit thereby reproduces any taste by combining the respective intensities of the saltiness, the sourness, the bitterness, the sweetness, and the umami, and this makes it possible to present the taste of the cooking object in the second space 20 to the taste sense of the user 1 in the first space 10.

For example, the scent output unit may present the scent of the cooking object to the smelling sense of the user 1 by spraying a liquid containing a scent component near the nose of the user 1.

Specifically, the scent output unit includes a plurality of cylinders in which liquids including respective scent components that are different from each other are sealed. The scent output unit sprays the liquids including the scent components in a fine mist form near the nose of the user 1 to thereby present the scent components included in the liquids to the smelling sense of the user 1. Accordingly, the scent output unit is able to control the scent to be felt by the user 1 by controlling the respective amounts of the liquids including the scent components. The scent output unit thereby reproduces any scent by combining the intensities of the of scent components, and this makes it possible to present the scent of the cooking object in the second space 20 to the smelling sense of the user 1 in the first space 10.

For example, the texture output unit may present the texture of the cooking object to the tactile sense of the user 1 by causing the user 1 to chew in the mouth a mechanism in which hardness is freely changeable by jamming transition. Specifically, the jamming transition is a phenomenon in which a powder and granular material behaves in such a manner that the hardness varies depending on a density. Thus, according to the jamming transition, it is possible to change hardness of a bag filled with air by changing an atmospheric pressure inside the bag. According to such a configuration, the texture output unit changes the atmospheric pressure inside the bag filled with air and causes the user 1 to bite the bag or the like, thereby making it possible to present the texture of the cooking object in the second space 20 to the tactile sense of the user 1 in the first space 10.

Alternatively, the texture output unit may present the texture of the cooking object to the tactile sense of the user 1 by electrically stimulating the jaw of the user 1 on the basis of a database in which pieces of myoelectric information of the jaw based on when a person masticates are accumulated. Specifically, the texture output unit may search the database in which pieces of myoelectric information are accumulated for myoelectric information corresponding to the texture of the cooking object, and present an electric stimulation that reproduces the texture of the cooking object to the jaw of the user 1 on the basis of the searched myoelectric information. According to such a configuration, the texture output unit is able to present the texture of the cooking object in the second space 20 to the tactile sense of the user 1 in the first space 10 by the electric stimulation.

However, it is needless to say that the presentation methods are not limited to the above, as long as the flavor output unit 131 is able to present the flavor of the cooking object to the sense such as the taste sense, the smelling sense, or the tactile sense of the user 1.

The information processing apparatus 100 includes a flavor presentation unit 110, the instruction generator 120, and a converter 140.

The flavor presentation unit 110 generates, on the basis of information related to the flavor of the cooking object sensed by the flavor sensor unit 211, data for presenting the flavor of the cooking object to the user 1. The generated data is outputted to the flavor output unit 131 and presented to the user 1 via the flavor output unit 131.

Specifically, the flavor presentation unit 110 may generate data for reproducing the taste, the scent, or the texture of the cooking object that is present in the second space 20 by the flavor output unit 131 in the first space 10, and presenting the taste, the scent, or the texture to the taste sense, the smelling sense, or the tactile sense of the user 1. Alternatively, the flavor presentation unit 110 may generate data for expressing the taste, the scent, or the texture of the cooking object that is present in the second space 20 by a numerical value, and visually presenting the taste, the scent, or the texture to the user 1.

The instruction generator 120 generates a control instruction for controlling the action of the cooking robot 200 on the basis of the operation input from the user 1 acquired by the input unit 133. Specifically, the instruction generator 120 may generate the control instruction for controlling the action of the cooking robot 200 on the basis of the action of the cooking robot 200 inputted by the user 1, and may generate the control instruction for controlling the action of the cooking robot 200 to trace the motion of the user 1 on the basis of the motion of the user 1. The generated control instruction is transmitted to the cooking robot 200 in the second space 20 via the network 31.

The converter 140 standardizes data transmitted and received between the information processing apparatus 100 and the cooking robot 200 via the network 31. Specifically, the converter 140 standardizes the control instruction generated by the instruction generator 120 and transmits the standardized control instruction to the cooking robot 200.

Figure 4A:
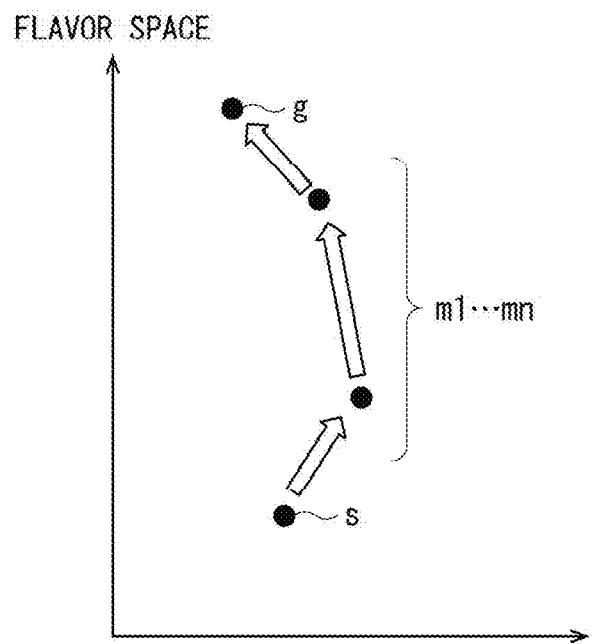
FIG. 4A is a graph illustrating an example of a trajectory from a current value to a target value in a flavor space.
Figure 4B:
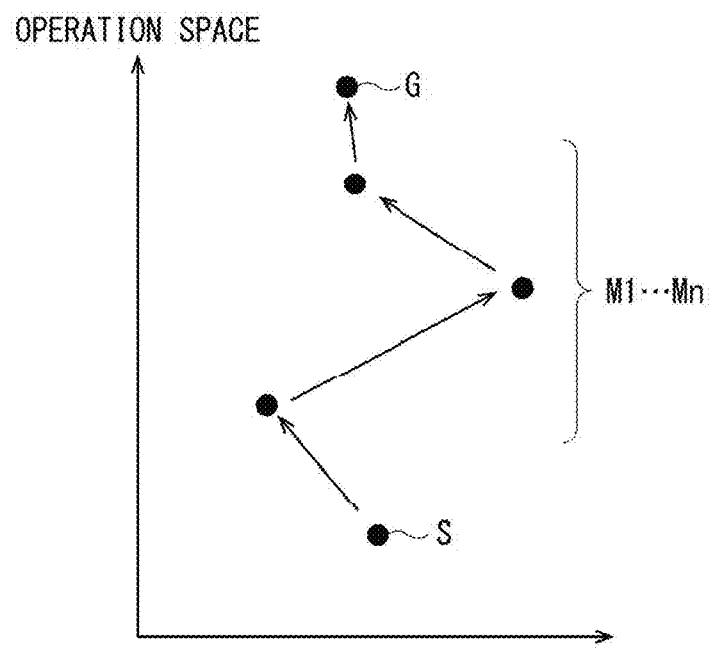
FIG. 4B is a graph illustrating an example of a trajectory from a current value to a target value in an operation space.

According to such a configuration of the first space 10 side, as illustrated in FIGS. 4A and 4B, the user 1 is able to control the cooking robot 200 toward a target goal while passing through a sub-goal in each of a flavor space and an operation space. FIG. 4A is a graph illustrating an example of a trajectory from a current value s to a target value g in the flavor space. FIG. 4B is a graph illustrating an example of a trajectory from a current value S to a target value G in the operation space.

For example, in the flavor space, as illustrated in FIG. 4A, the user 1 is able to control the cooking robot 200 in such a manner as to reach the target value g of the flavor of the cooking object from the current value s of the flavor of the cooking object presented by the flavor output unit 131 through a plurality of sub-goals m1 . . . mn.

However, it is the cooking robot 200 that the user 1 actually operates. Accordingly, in the operation space, as illustrated in FIG. 4B, the action of the cooking robot 200 is controlled in such a manner as to pass through a trajectory (that is, a trajectory reaching the target value G from the current value S through a plurality of sub-goals M1 . . . Mn) corresponding to the trajectory from the current value s to the target value g in the flavor space.

It is to be noted that, by making reference to the database stored in the DB server 32 to be described later, it is also possible to estimate: the trajectory from the current value S to the target value G in the operation space corresponding to the trajectory from the current value s to the target value g in the flavor space; and the sub-goals M1 . . . Mn to be passed through. In such a case, even if there is no specific operation input from the user 1, the cooking robot 200 may be controlled to pass through the estimated trajectory from the current value S to the target value G in the operation space and through the sub-goals M1 . . . Mn to be passed through. This allows the user 1 to control the action of the cooking robot 200 in such a manner that the flavor of the cooking object reaches the target value g by simple feedback, even if the user 1 does not perform the specific operation input.

Second Space 20 Side

As described above, the environment 2 includes the ingredient to be cooked by the cooking robot 200, the cooking utensil to be used for cooking to be performed by the cooking robot 200, and the kitchen which is the place where the cooking is to be performed by the cooking robot 200. The cooking robot 200 is able to complete a dish by cooking the ingredient included in the environment 2 with the cooking utensil in the kitchen on the basis of the control instruction from the information processing apparatus 100.

The cooking robot 200 includes a converter 240, the flavor sensor unit 211, the AV sensor unit 212, a robot controller 213, and a robot driver 222.

The flavor sensor unit 211 is a specific example of a sensing unit that acquires the flavor of the cooking object included in the environment 2 such as an ingredient, an ingredient during cooking, or a dish after being cooked. Specifically, the flavor sensor unit 211 may include a taste sensor that senses the taste of the cooking object, a scent sensor that senses the scent of the cooking object, and a texture sensor that senses the texture of the cooking object.

For example, the taste sensor is able to measure the taste of the cooking object by measuring membrane potential of a lipid membrane that interacts electrostatically and hydrophobically with a taste substance included in the cooking object.

Specifically, first, the taste sensor is immersed in a reference liquid to thereby obtain reference membrane potential. Thereafter, the taste sensor is brought into contact with the cooking object to obtain first membrane potential that is varied by the interaction between the taste substance and the lipid membrane. Thereafter, the taste sensor is co-washed with the reference liquid, following which the taste sensor is immersed in the reference liquid to obtain second membrane potential. The second membrane potential is membrane potential that differs from the reference membrane potential, because a bitterness substance and an astringent substance out of the taste substance are adsorbed on a surface of the lipid membrane. Thereafter, the taste sensor is washed with alcohol or the like to completely remove the taste substance adsorbed on the surface of the lipid membrane. The taste sensor is able to determine the taste of the cooking object on the basis of the measured first membrane potential and second membrane potential.

It is to be noted that the taste measurable by the taste sensor is different depending on the kind of the lipid membrane or the like. Thus, the taste sensor may measure the taste of the cooking object using a plurality of sensors, and determine the taste of the cooking object on the basis of the output from each of the plurality of sensors. For example, the taste sensor may include a bitterness sensor that is primarily able to measure bitterness, a sweetness sensor that is primarily able to measure sweetness, an umami sensor that is primarily able to measure umami, a saltiness sensor that is primarily able to measure saltiness, a sourness sensor that is primarily able to measure sourness, and an astringent taste sensor that is primarily able to measure astringency.

For example, the scent sensor is able to measure the scent of the cooking object by using a MEMS device in which sensor elements having an adsorption property to various scent components and whose frequency varies due to adsorption of the scent components to the sensor elements are arranged in an array. It is to be noted that the scent sensor may detect the adsorption of the scent component to the sensor element by a change in frequency on the array as described above, or by, for example, a change in a resistance value of a semiconductor included in the sensor element, an occurrence of a potential difference due to the adsorption of the scent component to an electrode of the sensor element, or an occurrence of deflection due to the adsorption of the scent component to the sensor element.

For example, the texture sensor is able to measure information related to the texture of the cooking object by compressing the cooking object. Specifically, first, the texture sensor measures a force signal based on when the cooking object is compressed by the texture sensor, and thereafter derives myoelectric information of the jaw based on when a person masticates the cooking object on the basis of a database in which a force signal based on when an ingredient is compressed by the texture sensor and myoelectric information of the jaw based on when a person masticates the same ingredient are associated with each other. Thereafter, the texture sensor electrically stimulates a muscle of the jaw of the user 1 on the basis of the derived myoelectric information of the jaw, which makes it possible to present the texture of the cooking object to the user 1

However, it is needless to say that the sensing methods are not limited to the above as long as the flavor sensor unit 211 is able to sense the flavor of the cooking object.

The AV sensor unit 212 acquires images and sounds of the environment 2 and the cooking robot 200. Specifically, the AV sensor unit 212 includes an imaging device that captures the environment 2 and a microphone that collects a sound to be generated in the environment 2. According to this, the AV sensor unit 212 is able to: acquire the visual information of the environment 2 by sensing a position relationship, a velocity, an acceleration, of the ingredient, the cooking utensil, and the kitchen included in the environment 2 by the imaging device; and acquire the auditory information by the microphone.

The robot controller 213 controls the action of the cooking robot 200 by controlling the robot driver 222 on the basis of the control instruction generated by the instruction generator 120. Specifically, the robot controller 213 may control the robot driver 222 in such a manner that, using a trajectory of the action of the cooking robot 200 included in the control instruction as a reference trajectory, a difference between a trajectory of an actual action of the cooking robot 200 and the reference trajectory becomes smaller. This allows the robot controller 213 to control the action of the cooking robot 200 in such a manner that the cooking robot 200 performs the action based on the control instruction. For example, the robot controller 213 may control driving of the arms of the cooking robot 200, effectors provided at the ends of the arms, and the legs.

The robot driver 222 is, for example, a motor or an actuator provided to each part of the cooking robot 200. For example, the robot driver 222 may be a motor or an actuator that rotates each joint of the cooking robot 200, or may be a motor or an actuator that drives a wheel or a leg provided to a movement mechanism for controlling movement of the cooking robot 200. The robot driver 222 is controlled by the robot controller 213 on the basis of the control instruction generated by the instruction generator 120, which makes it possible to cause the cooking robot 200 to perform the action in accordance with the operation input from the user 1.

As with the converter 140 of the information processing apparatus 100, the converter 240 standardizes data transmitted and received between the information processing apparatus 100 and the cooking robot 200 via the network 31. Specifically, the converter 240 may standardize: data related to the visual information such as the action, the position relationship, the velocity, or the acceleration of the environment 2 and the cooking robot 200 sensed by the AV sensor unit 212; data related to the auditory information such as the sound sensed by the AV sensor unit 212; and data related to the flavor information such as the taste, the scent, or the texture of the cooking object (the ingredient, the ingredient during cooking, or the dish after being cooked) included in the environment 2 sensed by the flavor sensor unit 211. Further, the converter 240 may also standardize data related the position, the velocity, and the force of each part of the cooking robot 200 sensed by various sensors provided to each robot driver 222 of the cooking robot 200, as data related to the action of the cooking robot 200. The converter 240 transmits the above-described standardized data to the cooking robot 200.

Network 31 and DB Server 32

The network 31 is a specific example of the communication path 30 that is configured to transmit and receive data between the first space 10 and the second space 20. The network 31 may be a wired or wireless communication network such as an Internet communication network, a LAN (Local Area Network), an infrared-based communication network, a radio communication network, or a satellite communication network.

The DB server 32 is a server that stores a database in which pieces of data related to cooking are accumulated. Specifically, the DB server 32 may store a database in which image data for performing image recognition of an ingredient and information related to the ingredient are correlated with each other. Further, the DB server 32 may store a database in which a name of cooking, states of an ingredient before and after the cooking, and the action of the cooking robot 200 for performing the cooking are correlated with each other. Still further, the DB server 32 may store a database in which a name of a dish, a food layout, and information indicating which position the cooked ingredient is to be placed at are correlated with each other. In addition, the DB server 32 may store a database in which a molecular structure of an ingredient, the taste, the scent, or the texture of the ingredient are correlated with each other. In such a case, the DB server 32 may further store a database in which the molecular structure of the ingredient which varies upon heating or cooking such as mixing with another ingredient is correlated with the taste, the scent, or the texture of the ingredient.

In a case where the above-described database is stored in the DB server 32, the cooking robot 200 is able to estimate the trajectory from the current value to the target value in the flavor space or the operation space by referring to the data accumulated in the database. Accordingly, in a case where a target value is set for the current value in the flavor space or the operation space by the user 1, the cooking robot 200 is also able to autonomously set an appropriate sub-goal and autonomously acts to perform cooking.

According to the cooking system of the present embodiment, in a case where the cooking robot 200 fails to act as intended by the user 1 with some kind of error, the user 1 is able to remotely operate the cooking robot 200 to solve the error and to act as intended by the user 1. For example, in a case where the cooking robot 200 deviates from the trajectory from the current value to the target value in the operation space due to an error, the user 1 is able to remotely return the cooking robot 200 to any sub-goal in the trajectory from the current value to the target value.

It should be noted that in a case where the flavor of the cooking object deviates from the trajectory from the current value to target value in the flavor space, in some cases, it may be difficult to return the flavor of the cooking object to any sub-goal in the trajectory from the current value to the target value In such cases, the user 1 may solve the error by resetting the target value in the flavor space. The DB server 32 may also accumulate pieces of data related to such a method of performing the error recovery autonomously by the user 1 in order to allow the cooking robot 200 to perform error recovery autonomously.

Further, in order to prevent the flavor of the cooking object from deviating from the trajectory in the flavor space, the cooking robot 200 may be controlled to adjust the flavor of the cooking object little by little. Specifically, the robot controller 213 may set more sub-goals for the trajectory in the flavor space included in the control instruction, and control the cooking robot 200 to adjust the flavor of the cooking object via more sub-goals.

1.3. Modification Example

Figure 5:
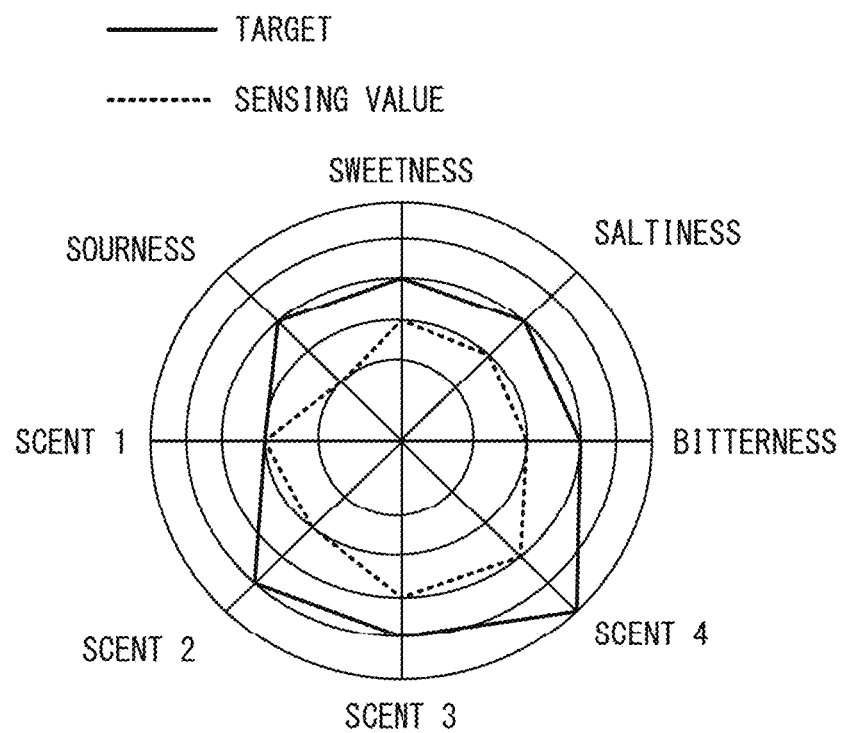
FIG. 5 is a graph illustrating an example of a visual presentation of a flavor of a cooking object of a modification example.
Figure 6:
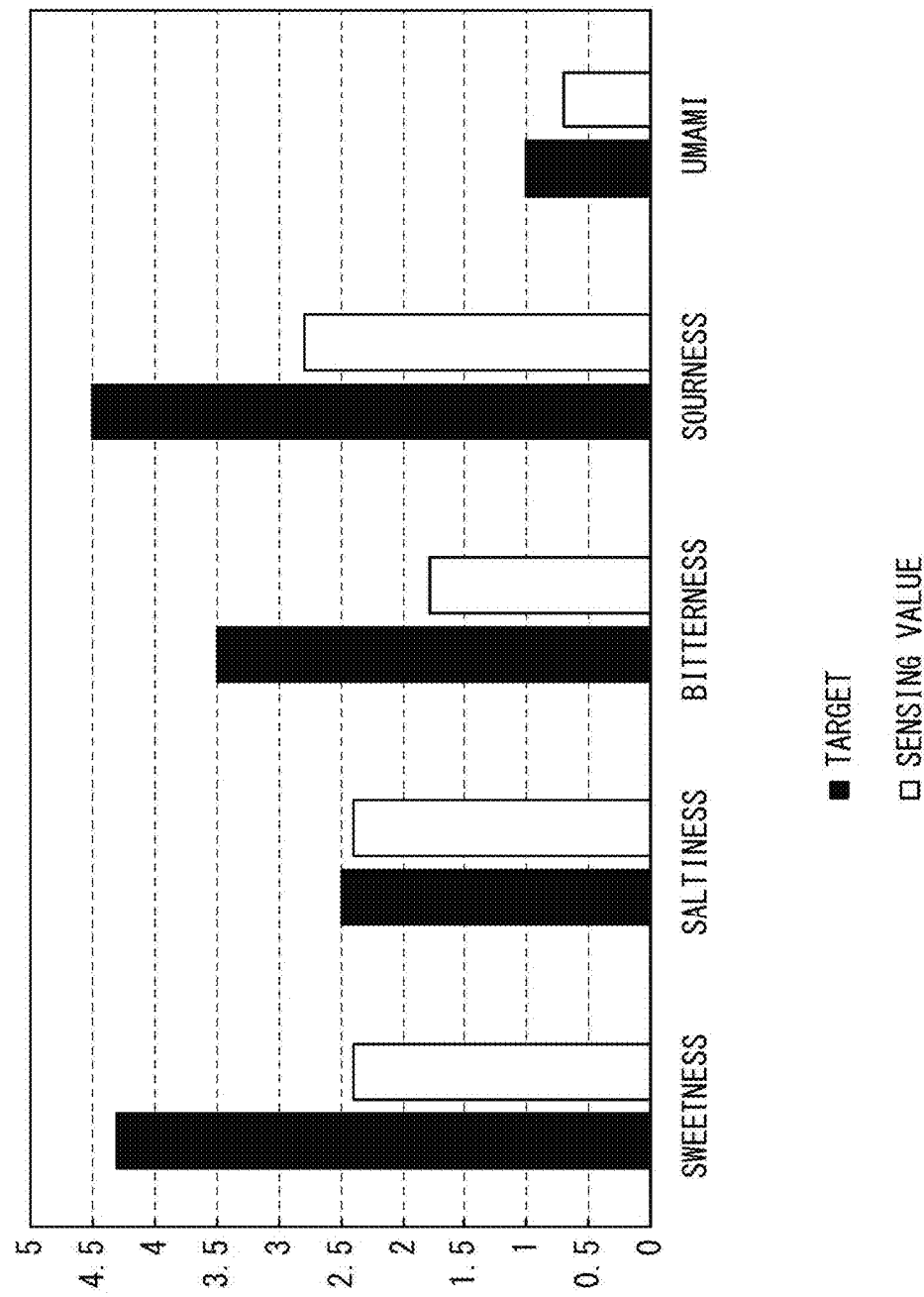
FIG. 6 is a graph illustrating another example of a visual presentation of the flavor of the cooking object of the modification example.

Next, referring to FIGS. 5 and 6, a modification example of the cooking system according to the present embodiment will be described. FIG. 5 is a graph illustrating an example of a visual presentation of the flavor of the cooking object. FIG. 6 is a graph illustrating another example of a visual presentation of the flavor of the cooking object.

As illustrated in FIGS. 5 and 6, the flavor including the taste, the scent, or the texture of the cooking object may be quantified and visualized in a graph or the like and presented to the user 1. In such a case, as with the AV output unit 132, the flavor output unit 131 may include a display device that is able to display an image, such as an LCD, a PDP, an OLED display, a hologram, a projector, or an HMD.

For example, as illustrated in FIG. 5, the taste and the scent (e.g., sourness, sweetness, saltiness, bitterness, scent 1, scent 2, scent 3, and scent 4) of the cooking object may be presented visually in a radar chart to the user 1. It is to be noted that, in the radar chart of FIG. 5, data of the texture is not illustrated; however, the data of the texture may be illustrated in the same radar chart as the data of the taste and the scent, or may be illustrated in a radar chart different from the radar chart of the taste and the scent.

Further, as illustrated in FIG. 6, the taste (e.g., sweetness, saltiness, bitterness, sourness, and umami) of the cooking object may be presented visually in a histogram to the user 1. It is to be noted that, in the histogram of FIG. 6, data of the scent and the texture is not illustrated; however, the data of scent and texture may be illustrated in the histogram as with the taste, or may be expressed in another method.

Accordingly, the user 1 is able to visually recognize the difference between the sensing value (the current value) and the target (the target value) of the cooking object, and is thus able to control the cooking robot 200 more easily. Thus, the user 1 is able to operate the cooking robot 200 while checking, by the operation of the cooking robot 200, that the sensed current value of the flavor of the cooking object is approaching the target value.

2. Second Embodiment 2.1. Configuration Example

Figure 7:
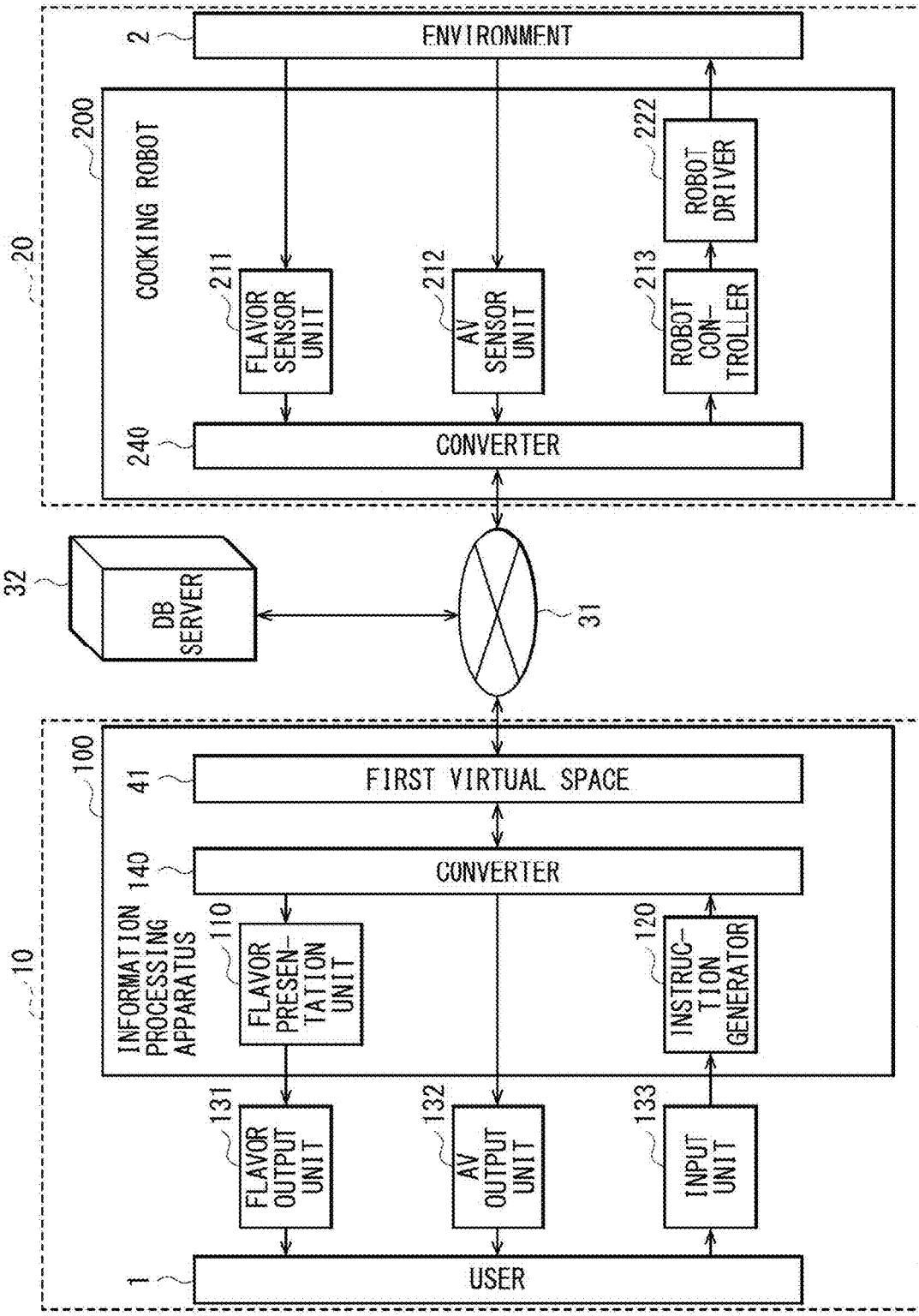
FIG. 7 is a block diagram illustrating an example of a configuration of a cooking system according to a second embodiment of the present disclosure.
Figure 8:
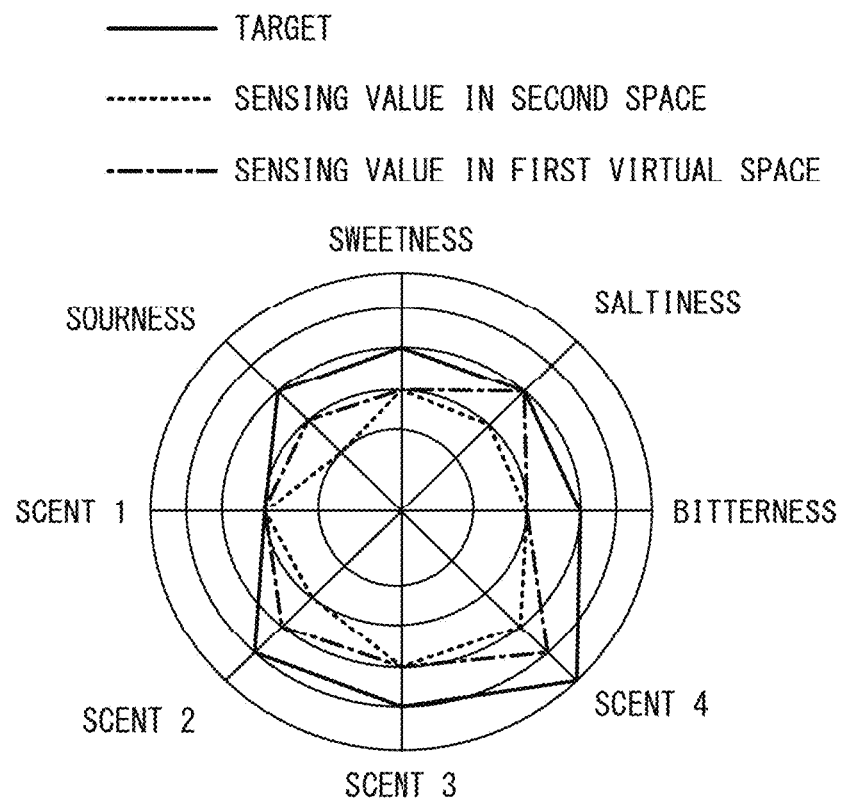
FIG. 8 is a graph illustrating an example of a visual presentation of a flavor of a cooking object of the cooking system according to the same embodiment.

Next, referring to FIGS. 7 and 8, a configuration example of a cooking system according to a second embodiment of the present disclosure will be described. FIG. 7 is a block diagram illustrating an example of a configuration of the cooking system according to the present embodiment. FIG. 8 is a graph illustrating an example of a visual presentation of a flavor of cooking object in the cooking system according to the present embodiment.

As illustrated in FIG. 7, the cooking system according to the second embodiment differs from the cooking system according the first embodiment in that a first virtual space 41 is further provided on the first space 10 side.

The first virtual space 41 is a virtual space that simulates the second space on the first space 10 side. Specifically, the first virtual space 41 is virtually provided with the cooking robot 200 and the environment 2 in the second space 20. The user 1 is able to perform cooking virtually by operating a virtual cooking robot in the first virtual space 41. The first virtual space 41 may be generated, for example, by the instruction generator 120 or the like of the information processing apparatus 100. The instruction generator 120 is able to generate a control instruction to the cooking robot 200 that is present in the second space 20 on the basis of an action performed by the user 1 on the virtual cooking robot in the first virtual space 41.

That is, various pieces of information are inputted to the first virtual space 41 from the cooking robot 200 on the second space 20 side, and thus, a status of the environment 2 in the second space 20, and the position, the velocity, the acceleration, and the force of the cooking robot 200 in the second space 20 are simulated and presented to the user 1. The user 1 is able to perform cooking of the cooking object by operating the virtual cooking robot in the first virtual space 41. The first virtual space 41 and the second space 20 are linked to each other by exchanging, between the first virtual space 41 and the second space 20: a control instruction to the virtual cooking robot based on the operation input of the user 1; and sensing results of the cooking robot 200 and the environment 2 in the second space 20.

The first virtual space 41 may be generated, for example, in a case where the first space 10 and the second space 20 are so separated as to cause a communication delay in communication via the network 31. In a case where the communication delay occurs between the first space 10 and the second space 20, the status of the environment 2 in the second space 20 is presented to the user 1 in the first space 10 in a delayed way due to the communication delay or the like, and the control instruction based on the operation input of the user 1 is transmitted to the cooking robot 200 in the second space in the delayed way due to the communication delay or the like. Accordingly, it is considered that it is difficult for the user 1 to control the cooking robot 200 at an appropriate timing.

The first virtual space 41 provided on the first space 10 side is a virtual space that reproduces the second space 20. There is no communication delay between the first virtual space 41 and the first space 10. Therefore, the user 1 performs cooking virtually by operating the virtual cooking robot in the first virtual space 41, thereby being able to perform cooking by the virtual cooking robot without considering the communication delay. The operation input to the virtual cooking robot performed by the user 1 in the first virtual space 41 is transmitted to the cooking robot 200 in the second space 20 as a control instruction. This makes it possible for the cooking robot 200 in the second space 20 to act as intended by the user 1.

However, between the first virtual space 41 and the second space 20, the status of the environment 2 and the action of the cooking robot 200 may not completely coincide with each other due to a time lag of sensing or the like. For example, the flavor of the cooking object after the cooking may not completely coincide with each other between the first virtual space 41 and the second space 20.

In such a case, for example, upon visually presenting the flavor of the cooking object to the user 1, as illustrated in FIG. 8, a sensing value in the second space (i.e., an actual current value of the second space 20) may be presented, in addition to the target value and a sensing value in the first virtual space 41 (i.e., an apparent current value in the first virtual space 41). This makes it possible for the user 1 to visually check a difference between the first virtual space 41 and the second space 20 in terms of the flavor of the cooking object, thus making it possible to operate the cooking robot 200 in such a manner as to bring the flavor of the cooking object in the second space 20 to be closer to the target value.

2.2. Action Example

Figure 9:
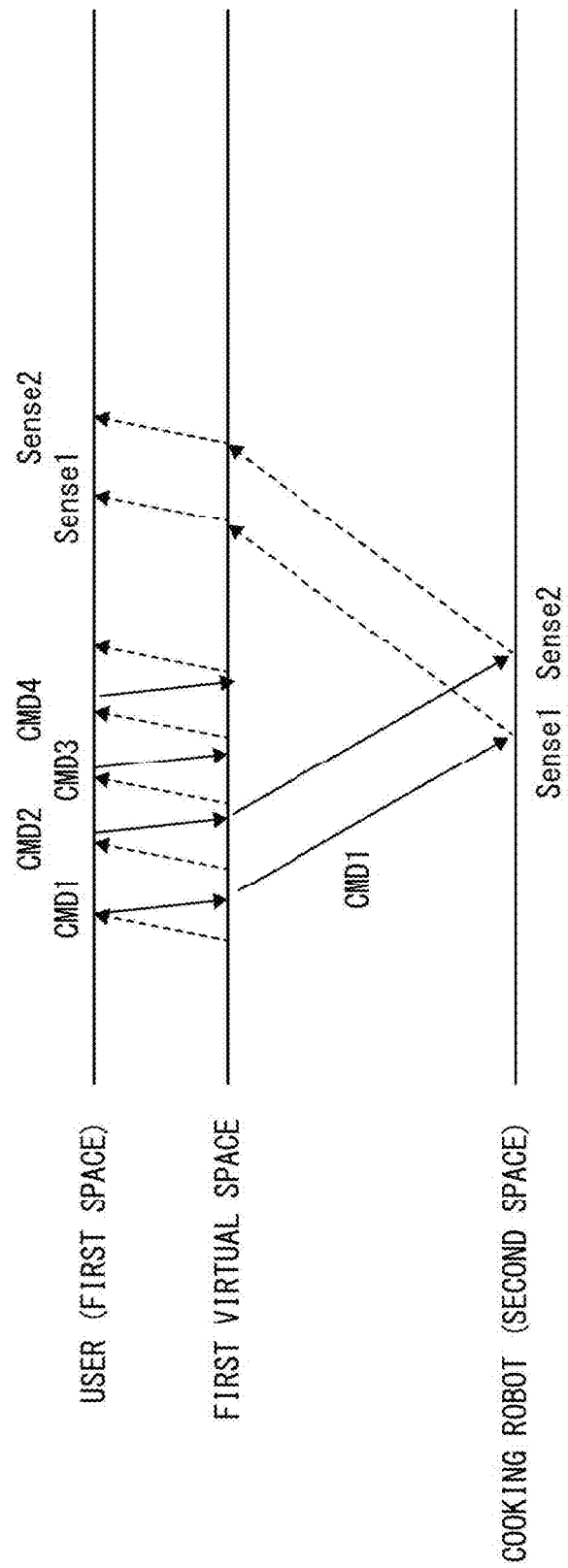
FIG. 9 is a block diagram illustrating an example of an action of the cooking system according to the same embodiment.

Subsequently, referring to FIG. 9, an action example of the cooking system according to the present embodiment will be described. FIG. 9 is a block diagram illustrating an example of the cooking system according to the present embodiment.

As illustrated in FIG. 9, the user 1 generates a command 1 (CMD1) by operating the virtual cooking robot in the first virtual space 41. Thereafter, the user 1 sequentially generates a command 2 (CMD2), a command 3 (CMD3), and a command 4 (CMD4) in response to a change in the first virtual space 41 caused by the command 1 (CMD1).

The command 1 (CMD1), the command 2 (CMD2), the command 3 (CMD3), and the command 4 (CMD4) are transmitted with the communication delay to the cooking robot 200 in the second space 20 to control the cooking robot 200 and cause the cooking robot 200 to perform cooking.

The sensing results (e.g., Sense1 and Sense2) in the second space 20 are transmitted with the communication delay to the first virtual space 41. Accordingly, the user 1 is able to check, in the first virtual space 41 with a time lag, the change in the status in the second space 20 caused by the command 1 (CMD1), the command 2 (CMD2), the command 3 (CMD3), and the command 4 (CMD4).

According to the cooking system of the present embodiment, no communication delay occurs between the user 1 in the first space 10 and the first virtual space 41. This makes it possible for the user 1 to solve the time lag (i.e., the operation delay) between the operation input and the action of the cooking robot 200 caused by the communication delay between the first space 10 and the second space 20, and to operate the cooking robot 200.

3. Third Embodiment 3.1. Configuration Example

Figure 10:
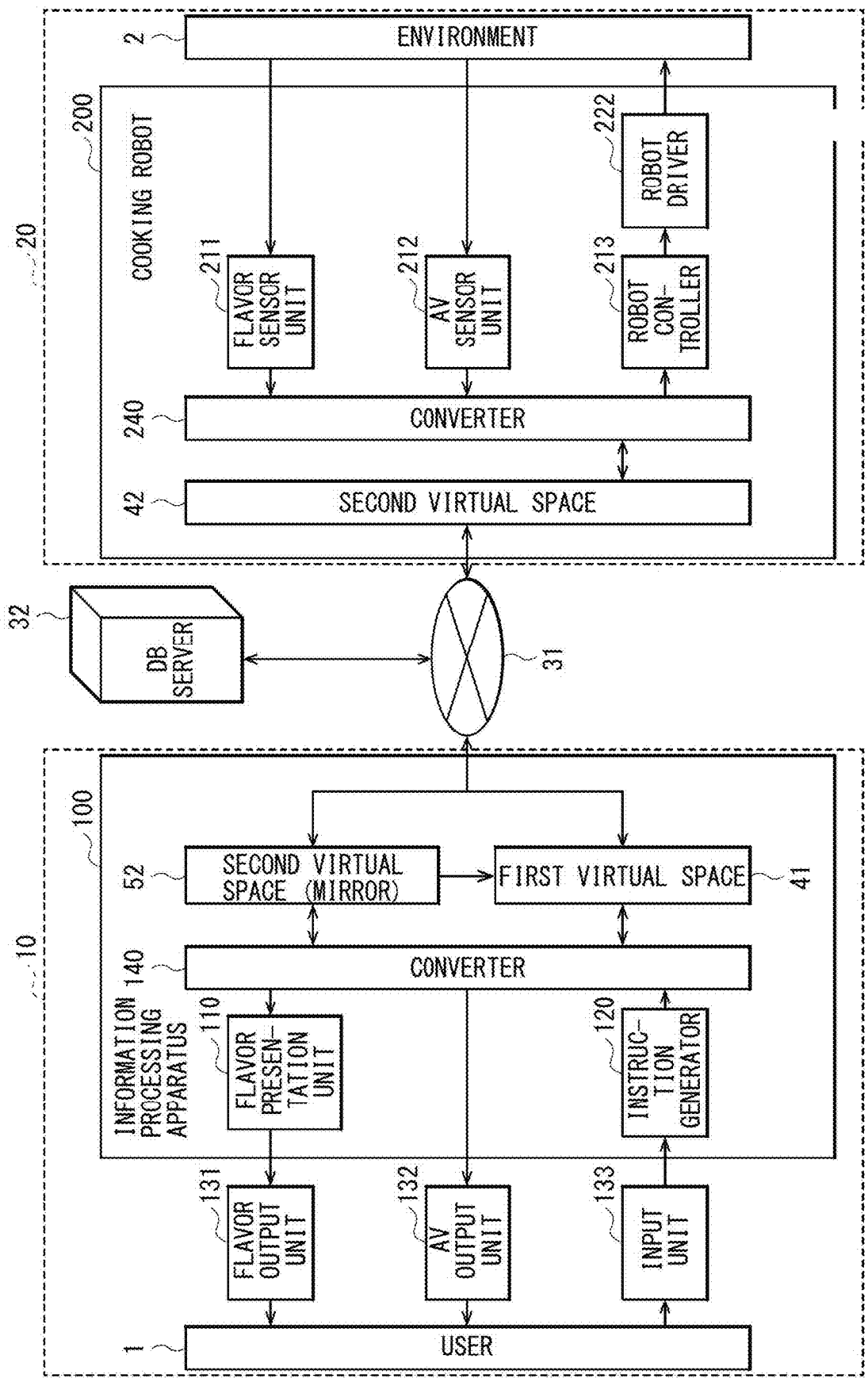
FIG. 10 is a block diagram illustrating an example of a configuration of a cooking system according to a third embodiment of the present disclosure.

Subsequently, referring to FIG. 10, a configuration example of a cooking system according to a third embodiment of the present disclosure will be described. FIG. 10 is a block diagram illustrating an example of a configuration of the cooking system according to the present embodiment.

As illustrated in FIG. 10, the cooking system according to the third embodiment differs from the cooking system according the second embodiment in that a second virtual space 42 is further provided on the second space 20 side.

The second virtual space 42 is a virtual space that simulates the second space 20 on the second space 20 side. Specifically, the second virtual space 42 is virtually provided with the cooking robot 200 and the environment 2 in the second space 20. The control instruction transmitted from the information processing apparatus 100 is transmitted to each of the second virtual space 42 and the cooking robot 200 in the second space 20, while checking that the second virtual space 42 is updated on the basis of the sensing result of the environment 2. The second virtual space 42 may be generated, for example, by the robot controller 213 or the like of the cooking robot 200.

That is, the control instruction generated on the basis of the operation input from the user 1 to the virtual cooking robot in the first virtual space 41 is temporarily stored in a cache in the second virtual space 42. Thereafter, the temporarily stored control instruction is sequentially transmitted to the virtual cooking robot in the second virtual space 42 and the cooking robot 200 in the second space 20 after checking the status of the environment 2 in the second virtual space 42 updated on the basis of the sensing result of the environment 2 in the second space 20.

Further, the sensing result of the environment 2 in the second space 20 applied to the second virtual space 42 is also applied to a second virtual space (mirror) 52 on the first space 10 side, and is presented to the user 1 via the second virtual space (mirror) 52. The second virtual space (mirror) 52 may be generated, for example, by an arithmetic device of the information processing apparatus 100. According to such a configuration, if an error occurs in the control of the cooking robot 200 and the status of the environment 2 in the second space 20 turned into a status that is not intended by the user 1, the user 1 compares the first virtual space 41 and the second virtual space (mirror) 52 with each other to thereby clarify the difference depending on the presence or absence of the error and makes it possible to appropriately solve the error.

The second virtual space 42 may be generated, for example, in a case where the first space 10 and the second space 20 are so separated as to cause a communication delay in communication via the network 31. In a case where the communication delay occurs between the first space 10 and the second space 20, a delay may occur between the control instruction transmitted from the first space 10 side and the cooking robot 200 on the second space 20 side, and a deviation may occur between the control instruction and the action of the cooking robot 200.

There is no communication delay between the second virtual space 42 provided on the second space 20 side and the second space 20. Therefore, the cooking robot 200 temporarily stores the control instruction generated by the instruction generator 120 in the cache in the second virtual space 42, and applies the control instruction to the control of the action while checking the status of the environment 2 in the second space 20, thereby making it possible to perform the action without causing a deviation between the control instruction and the action.

3.2. Action Example

Figure 11:
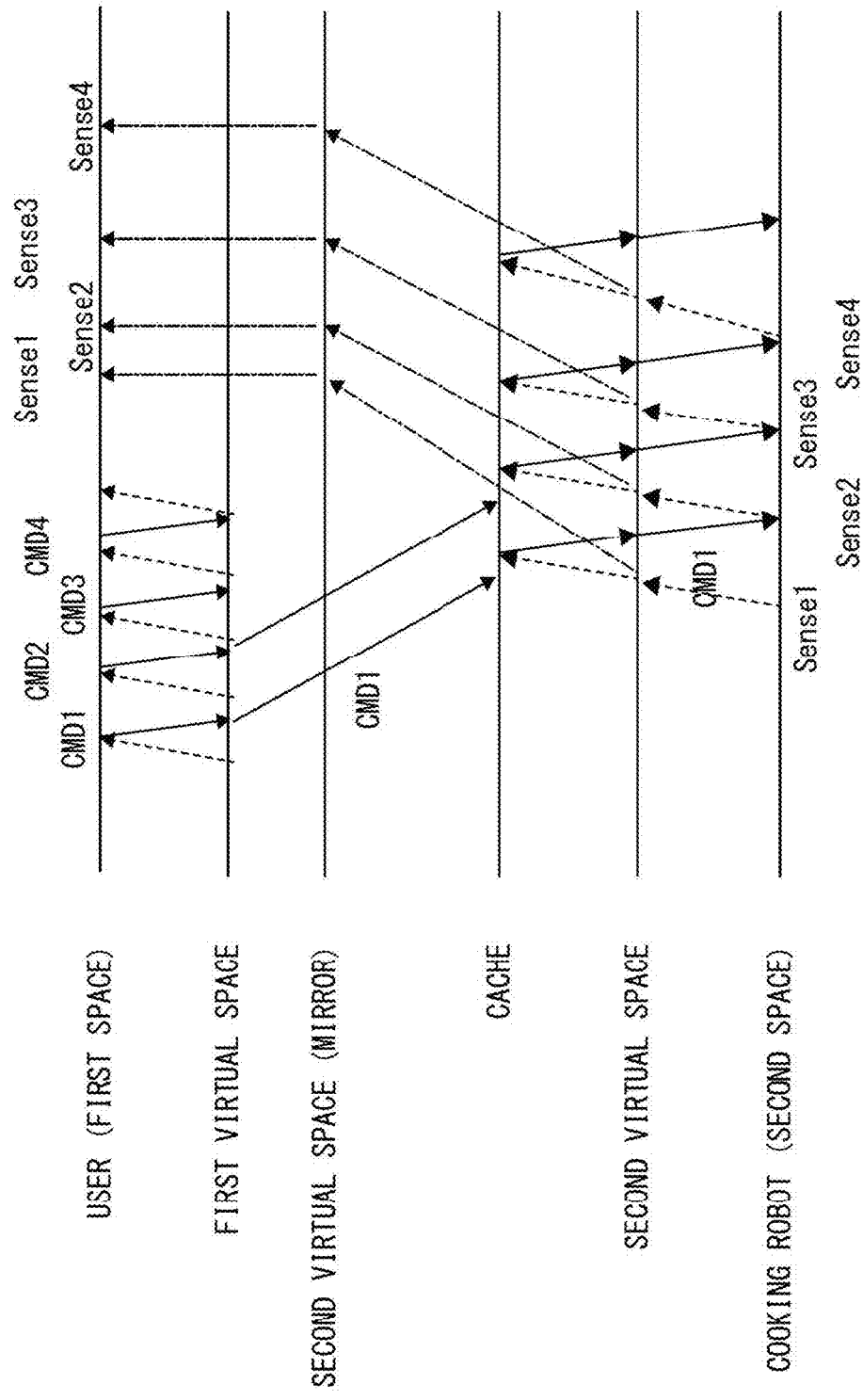
FIG. 11 is a block diagram illustrating an example of an action of the cooking system according to the same embodiment.
Figure 12:
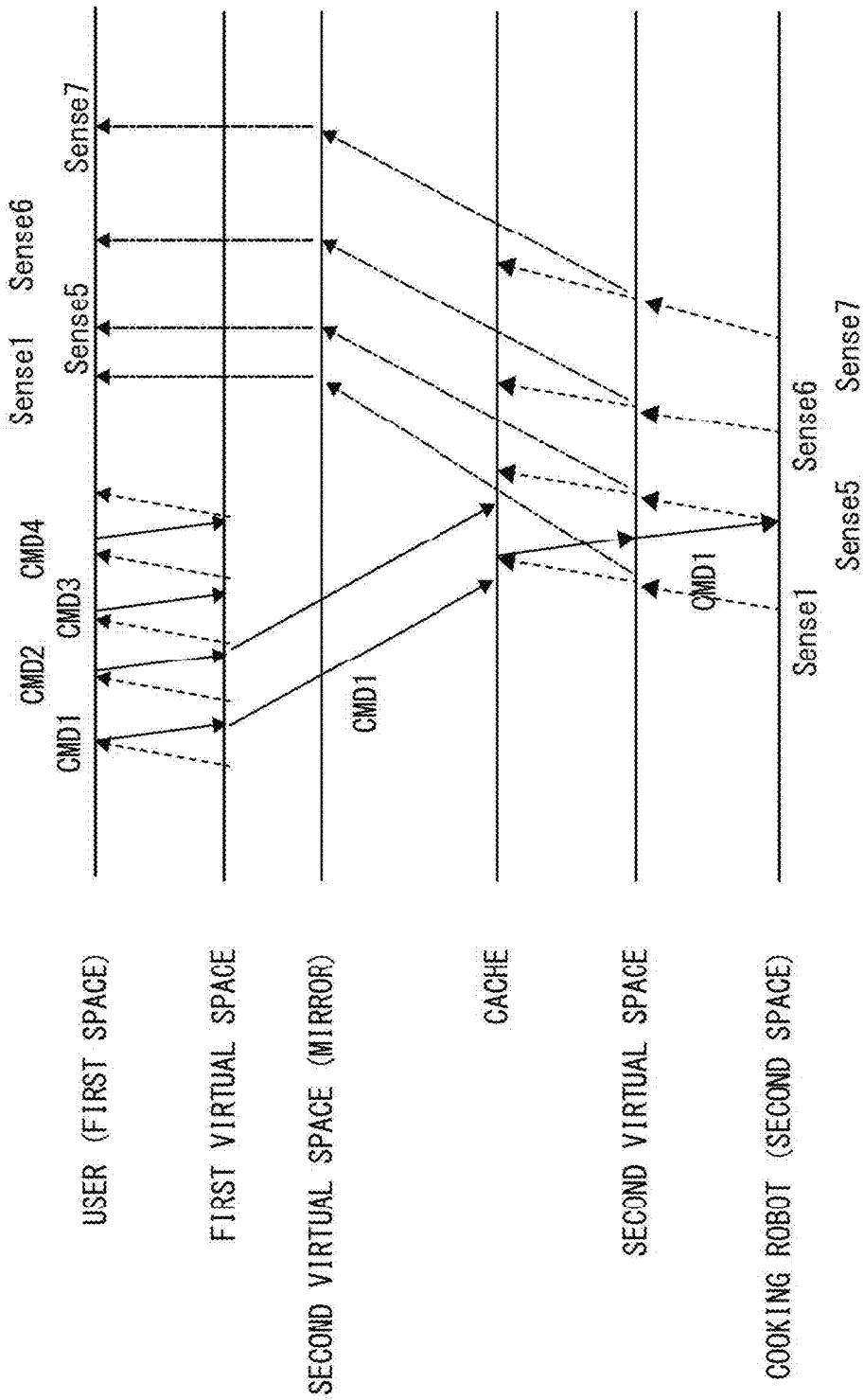
FIG. 12 is a block diagram illustrating another example of an action of the cooking system according to the same embodiment.

Subsequently, referring to FIGS. 11 and 12, action examples of the cooking system according to the present embodiment will be described. FIG. 11 is a block diagram illustrating an example of an action of the cooking system according to the present embodiment. FIG. 12 is a block diagram illustrating another example of an action of the cooking system according to the present embodiment.

The action example of the cooking system illustrated in FIG. 11 is an action example in a case where no error occurs on the cooking robot 200 side.

As illustrated in FIG. 11, the user 1 generates a command 1 (CMD1) by operating the virtual cooking robot in the first virtual space 41. Thereafter, the user 1 sequentially generates a command 2 (CMD2), a command 3 (CMD3), and a command 4 (CMD4) in response to a change in the first virtual space 41 caused by the command 1 (CMD1).

The command 1 (CMD1), the command 2 (CMD2), the command 3 (CMD3), and the command 4 (CMD4) are transmitted with the communication delay to the cache in the second virtual space 42 and are temporarily stored. The second virtual space 42 is updated by sensing results (e.g., Sense1, Sense2, Sense3, and Sense4) in the second space 20. The command 1 (CMD1), the command 2 (CMD2), the command 3 (CMD3), and the command 4 (CMD4) are transmitted sequentially from the cache to the virtual cooking robot in the second virtual space 42 and the cooking robot 200 in the second space 20 while checking the sensing results (e.g., Sense1, Sense2, Sense3, and Sense4) in the second space 20.

Further, the sensing results (e.g., Sense1, Sense2, Sense3, and Sense4) in the second space 20 are reflected in the second virtual space 42 and are thereafter transmitted with the communication delay to the second virtual space (mirror) 52 on the first space 10 side, and a status in the second virtual space (mirror) 52 is updated. Accordingly, the user 1 is able to check, in the second virtual space (mirror) 52 with a time lag, the change in a status in the second space 20 caused by the command 1 (CMD1), the command 2 (CMD2), the command 3 (CMD3), and the command 4 (CMD4).

The action example of the cooking system illustrated in FIG. 12 is an action example in a case where an error occurs on the cooking robot 200 side.

As illustrated in FIG. 12, as with FIG. 11, the user 1 generates a command 1 (CMD1) by operating the virtual cooking robot in the first virtual space 41. Thereafter, the user 1 sequentially generates a command 2 (CMD2), a command 3 (CMD3), and a command 4 (CMD4) in response to a change in the first virtual space 41 caused by the command 1 (CMD1).

The command 1 (CMD1), the command 2 (CMD2), the command 3 (CMD3), and the command 4 (CMD4) are transmitted with the communication delay to the cache in the second virtual space 42 and are temporarily stored. The second virtual space 42 is updated by a sensing result (e.g., Sense1) in the second space 20. The command 1 (CMD1) is transmitted from the cache to the virtual cooking robot in the second virtual space 42 and the cooking robot 200 in the second space 20 while checking the sensing result (e.g., Sense1) in the second space 20.

Here, it is assumed that an error occurs after the cooking robot 200 in the second space 20 is controlled by the command 1 (CMD1), and the cooking robot 200 in the second space 20 does not perform the action normally. In such a case, the command 2 (CMD2), the command 3 (CMD3), and the command 4 (CMD4), which follow the command 1 (CMD1), are not transmitted to the virtual cooking robot in the second virtual space 42 and the cooking robot 200 in the second space 20, and remain temporarily stored in the cache.

Thereafter, sensing results (e.g., Sense1, Sense5, Sense6, and Sense7) of the status in the second space 20 are reflected in the second virtual space 42, and are thereafter transmitted with the communication delay to the second virtual space (mirror) 52 on the first space 10 side, and the status in the second virtual space (mirror) 52 is updated. Accordingly, the user 1 is able to check, in the second virtual space (mirror)

52 with a time lag, that the environment 2 in the second space 20 has changed to an unintended status after the command 1 (CMD1). Further, the user 1 is able to grasp the action to be performed by the cooking robot 200 in the second space 20 in order to solve the error, by checking a difference between the first virtual space 41 and the second virtual space (mirror) 52.

According to cooking system of the present embodiment, no communication delay occurs between the second virtual space 42 and the second space 20. This makes it possible for the cooking robot 200 to solve the time lag (i.e., a control delay) between the control instruction and the action of the cooking robot 200, and to perform the action.

4. Fourth Embodiment

4.1. Outline

Figure 13A:
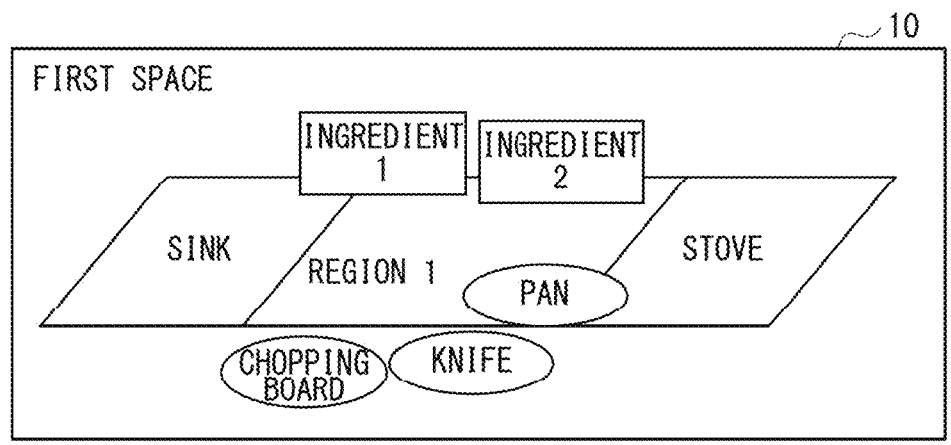
FIG. 13A is a schematic view of an example of a disposition of objects in a first space.
Figure 13B:
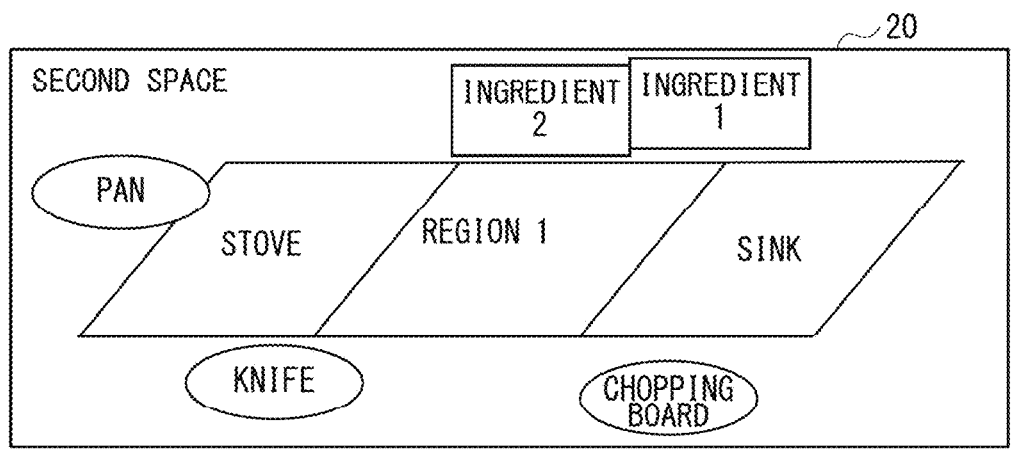
FIG. 13B is a schematic view of an example of a disposition of objects in a second space.

Subsequently, referring to FIGS. 13A and 13B, an outline of the cooking system according to a fourth embodiment of the present disclosure will be described. In the cooking system according to the fourth embodiment, a kitchen, an ingredient, and the like are also disposed on the first space 10 side, and the user 1 actually performs cooking using the kitchen and the ingredient in the first space 10. The cooking system according to the fourth embodiment observes a motion of the user and motions of the ingredient and the cooking utensil in the kitchen with use of a sensor or the like, and is able to cause the cooking robot 200 in the second space 20 to perform cooking on the basis of a result of the observation. FIG. 13A is a schematic view of an example of a disposition of objects in the first space 10. FIG. 13B is a schematic view of an example of a disposition of objects in the second space 20.

For example, in a case where the user 1 performs cooking in the first space and causes the cooking robot 200 in the second space 20 to perform the action in such a manner as to trace the motion of the user 1, the disposition of objects in the first space 10 and the disposition of objects in the second space can be different from each other, as illustrated in FIGS. 13A and 13B. Specifically, respective positions of a sink, a stove, and a free space (a region 1) of the kitchen, respective positions of ingredients, and respective positions of cooking utensils including a chopping board, a knife, and the like can differ between the first space 10 and the second space 20.

In such a case, it is difficult for the cooking robot 200 to execute cooking in a similar manner as the user 1 even if the cooking robot 200 moves the arms or the like so as to trace the motion of the user 1. That is, it is important that the cooking robot 200 grasp a meaning of the cooking process executed by the user 1 in the first space 10 and execute the action in the second space 20 so as to execute the cooking process of the same meaning.

In the cooking system according to present embodiment, the information processing apparatus 100 grasps the meaning of the motion of the user 1 in the first space 10, and transmits the control instruction based on the grasped meaning to the cooking robot 200. The cooking robot 200 executes, in the second space 20, the action having the same meaning as the meaning of the motion of the user 1, thereby making it possible to execute cooking similar to that performed by the user 1, even if the first space 10 and the second space differs from each other in the disposition of the objects.

4.2. Configuration Example

Figure 14:
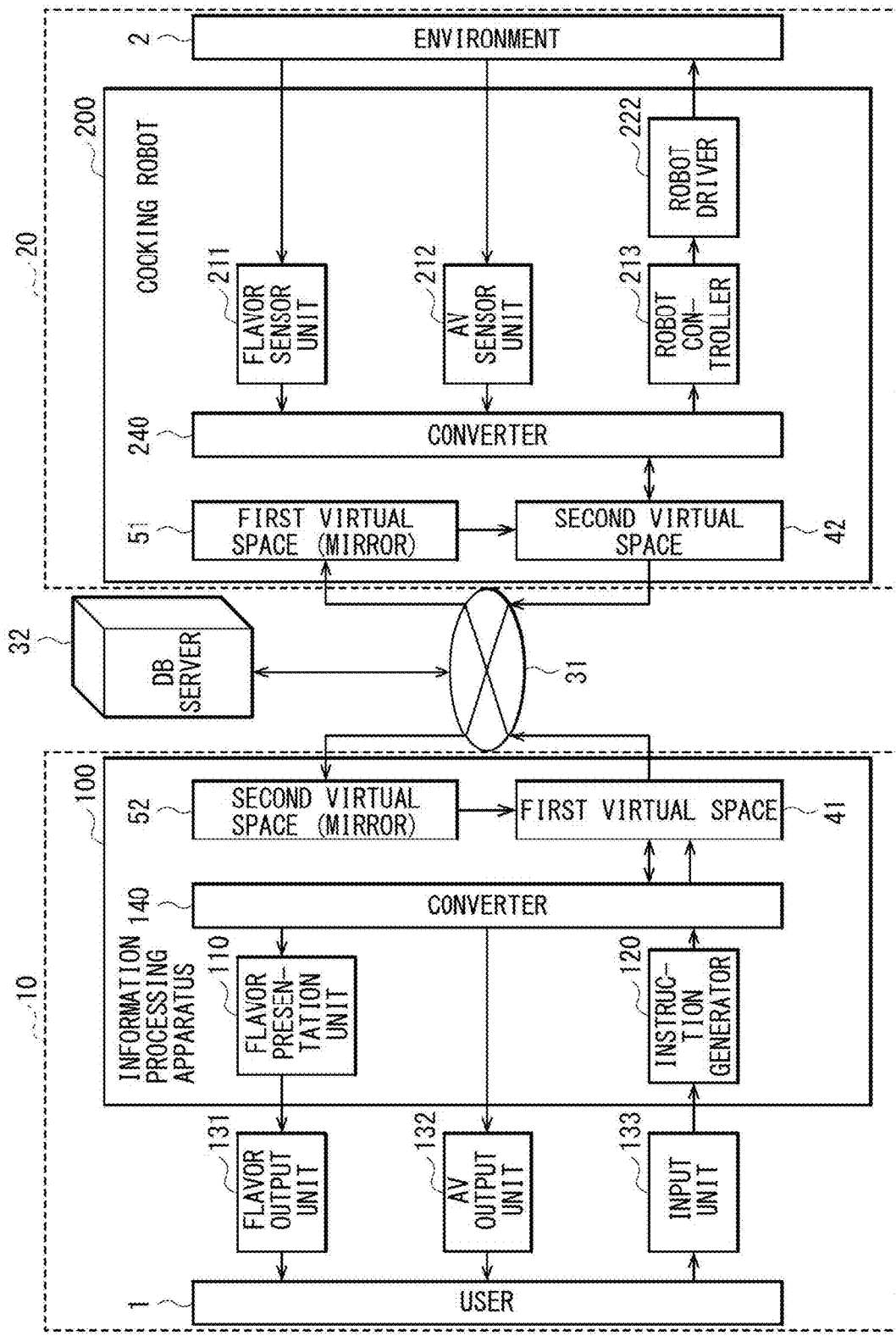
FIG. 14 is a block diagram illustrating an example of a more specific configuration of a cooking system according to a fourth embodiment of the present disclosure.
Figure 15A:
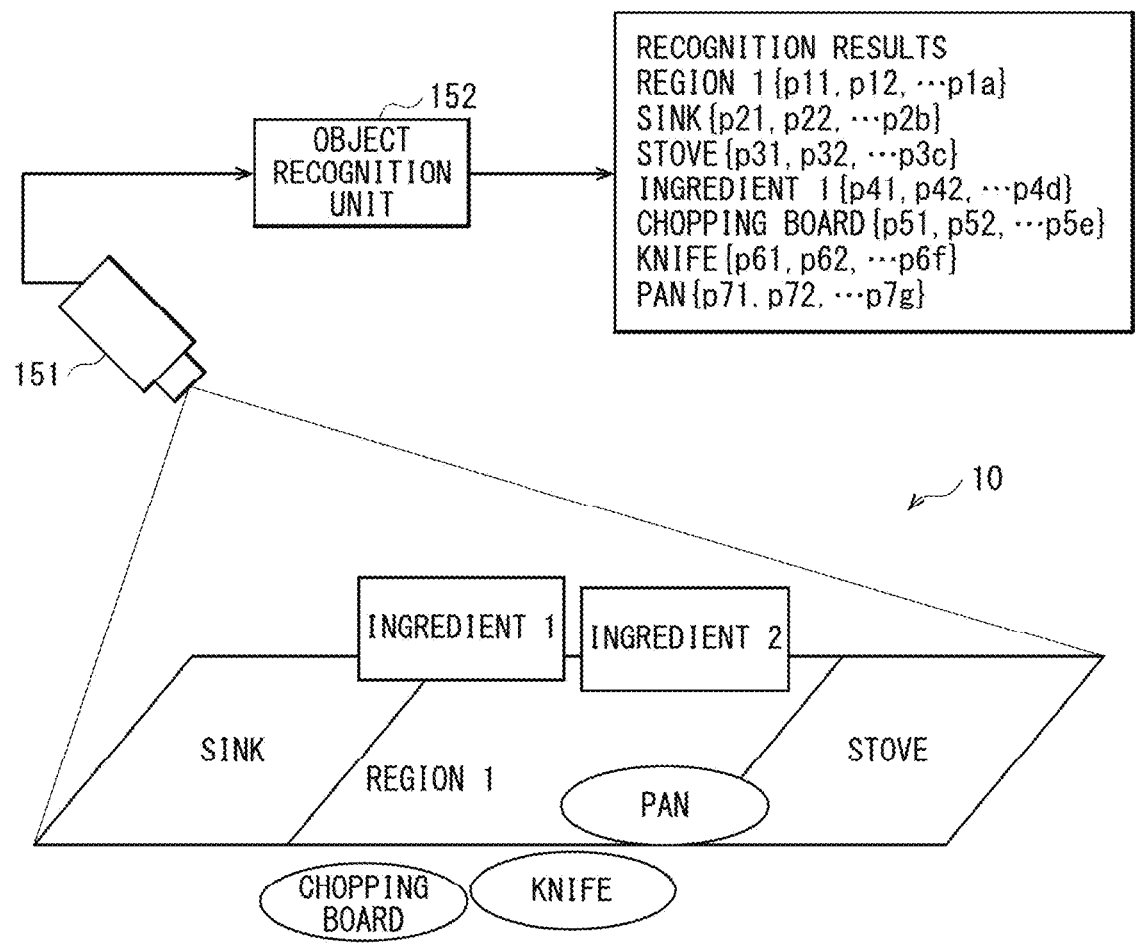
FIG. 15A is a schematic view for explaining a correlation of the disposition of objects in the first space.
Figure 15B:
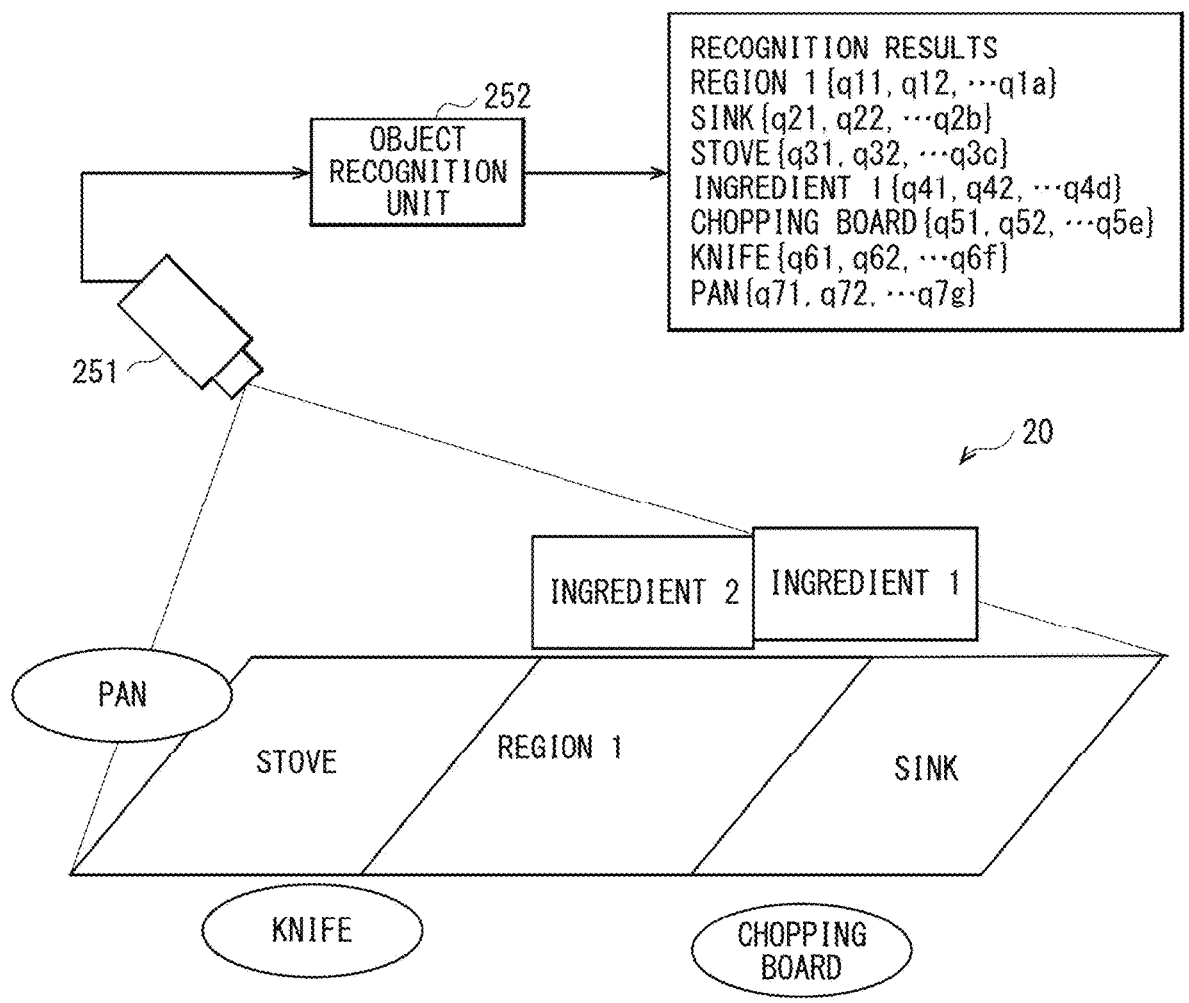
FIG. 15B is a schematic view for explaining a correlation of the disposition of objects in the second space.

Next, referring to FIGS. 14 to 15B, a configuration example of the cooking system according to the present embodiment will be specifically described. FIG. 14 is a block diagram illustrating an example of a more specific configuration of the cooking system according to the present embodiment. FIGS. 15A and 15B are schematic views for explaining a correlation between disposition of objects in the first space 10 and disposition of objects in the second space 20.

As illustrated in FIG. 14, the cooking system according to the fourth embodiment differs from the cooking system according to the first embodiment in that the first virtual space 41 and the second virtual space (mirror) 52 are provided on the first space 10 side, and the second virtual space 42 and a first virtual space (mirror) 51 are provided on the second space 20 side. Further, the environment 2 in which the cooking is to be performed is different between the first space 10 and the second space 20, and correlation based on a meaning of information is performed between the first space 10 and the second space 20. It is to be noted that the first virtual space 41 may be generated by the instruction generator 120 or the like, and the second virtual space (mirror) 52 may be generated by the arithmetic device of the information processing apparatus 100. The second virtual space 42 may be generated by the robot controller 213 or the like, and the first virtual space (mirror) 51 may be generated by an arithmetic device of the cooking robot 200.

Specifically, as illustrated in FIG. 15A, each part, an ingredient, and a cooking utensil (hereinafter also collectively referred to as an object) of the kitchen in the first space 10 are imaged by an imaging device 151. The object recognition unit 152 is able to recognize a name (i.e., a meaning) and a position (i.e., coordinates of each vertex, etc.) of the object in the first space 10, by performing image recognition on the basis of an image captured by the imaging device 151. Similarly, as illustrated in FIG. each part, an ingredient, and a cooking utensil (hereinafter also collectively referred to as an object) of the kitchen in the second space 20 are imaged by an imaging device 251. The object recognition unit 252 is able to recognize a name (i.e., a meaning) and a position (i.e., coordinates of each vertex, etc.) of the object in the second space 20, by performing image recognition on the basis of an image captured by the imaging device 251. Accordingly, the objects in the first space 10 and the objects in the second space 20 are correlated with each other in accordance with the name or the meaning, and this allows a difference in position between the objects to be recognized.

It is to be noted that the object recognition units 152 and 252 may recognize the names (i.e., meanings) and the positions of the respective objects in the first space and the second space 20 by image recognition using a machine-learning technique such as deep neural network. Alternatively, the information processing apparatus 100 may present respective images in the first space 10 and the second space 20 to the user 1 to cause the user 1 to perform correlation and position identification on the objects in the first space 10 and the second space 20. Further, the information processing apparatus 100 may use the image recognition by the object recognition units 152 and 252 and the manual correlation by the user 1 in combination to perform correlation and position identification on the objects in the first space 10 and the second space 20.

In the cooking system according to the present embodiment, first, the user 1 performs the action of executing the cooking process in the first virtual space 41 that simulates the first space 10 on the first space 10 side. The action of the user 1 is transmitted via the network 31 to the first virtual space (mirror) 51 that reproduces the first virtual space 41 on the second space 20 side. Thereafter, the action of the user 1 in the first virtual space (mirror) 51 is converted, on the basis of correlation based on the meaning of the action, into the action of the virtual cooking robot in the second virtual space 42 that simulates the second space 20 on the second space 20 side. Thereafter, the action of the virtual cooking robot in the second virtual space 42 is reflected in the actual action of the cooking robot 200 in the second space 20.

Further, the change in the environment 2 in the second space 20 caused by the action of the cooking robot 200 is reflected in the second virtual space 42, and is thereafter reflected in the second virtual space (mirror) 52 that reproduces the second virtual space 42 on the first space 10 side. Thereafter, the status of the environment 2 in the second virtual space (mirror) 52 is converted, on the basis of correlation based on the meaning, into the status of the environment 2 in the first virtual space 41.

According to this, the cooking system according to the present embodiment is able to cause the cooking robot 200 in the second space 20 to perform the action having the same meaning as the action of the user 1 by the user 1 performing the action on the object that is correlated between the first space 10 and the second space 20.

For example, in a case where the user 1 in the first space 10 performs the action of "placing the chopping board on the region 1", the cooking robot 200 in the second space 20 recognizes the action of the user 1 as the following action command, and is able to place the "chopping board" in the second space 20 on the "region 1".

1. If Hand1(Clear) then PickUp(chopping board)
2. If Hand1(chopping board) then Move(Hand1, On(region 1))
3. If Hand1(on(region 1)) then Release(Hand1)

In the above, "If Hand1(Clear)", "If Hand1(chopping board)", and "If Hand1(on(region 1)" are checked for each step in order to execute the action if the cooking robot 200 satisfies a precondition for performing the action. In the case where the cooking robot 200 does not satisfy the precondition, execution of the action may be stopped and the action may be restarted by returning to the previous step. For example, after checking the current positions of "Hand1" and "chopping board" again, the state of "Hand1" may be set to "Clear" and the steps of the above action may be repeated from the beginning. If the error is not solved by the method described above, the cooking robot 200 may send, to the user 1, a request to solve the error.

According to the above configuration, the cooking system according to the present embodiment is able to control the action of the cooking robot 200 in the second space 20 by the action of the user 1 in the first space 10, even in between the first space 10 and the second space 20 which differ from each other in a disposition of objects. Therefore, according to the cooking system of the present embodiment, the cooking robot 200 in the second space 20 which differs from the first space 10 in the disposition of the objects is able to perform the cooking similar to that performed by the user 1 in the first space 10.

4.3. Modification Example

Figure 16:
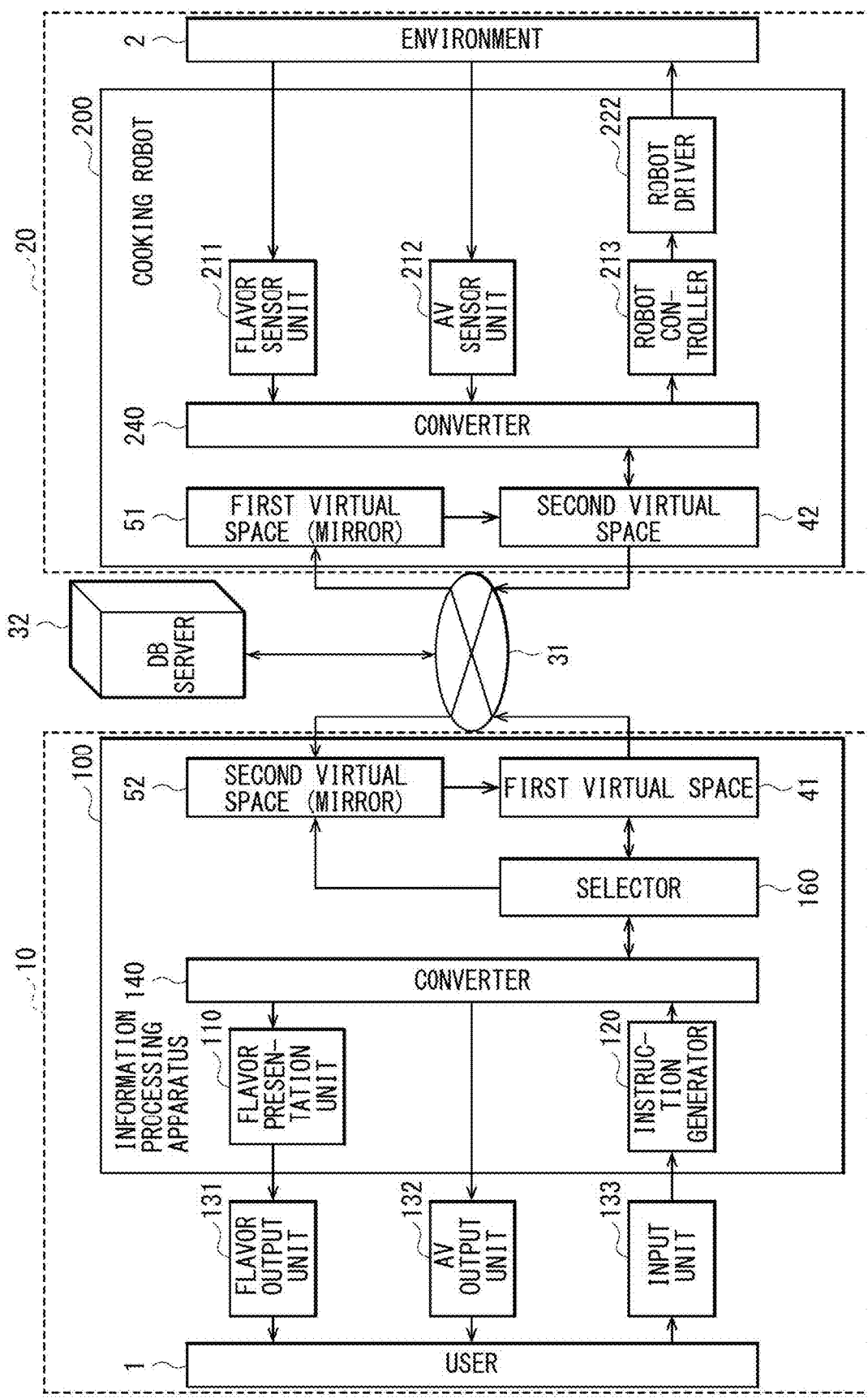
FIG. 16 is a block diagram illustrating an example of a configuration of a modification example of the cooking system according to the same embodiment.

Next, referring to FIG. 16, a modification example of the cooking system according to the present embodiment will be described. FIG. 16 is a block diagram illustrating an example of a configuration of the modification example of the cooking system according to the present embodiment.

As illustrated in FIG. 16, the modification example of the cooking system according to the present embodiment differs from the cooking system according to the fourth embodiment in that the information processing apparatus 100 is further provided with a selector 160.

The selector 160 switches the virtual space that user 1 is able to check or operate between the first virtual space 41 and the second virtual space (mirror) 52. With use of the selector 160, it becomes possible for the user 1 on the first space 10 side to directly check the status in the second virtual space (mirror) 52 that simulates the second space 20, and to directly operate the virtual cooking robot in the second virtual space (mirror) 52. This makes it possible, in a case where an error occurs in the cooking robot 200 in the second space 20, for the user 1 to directly solve the error that has occurred in the second space 20 by checking a cause of the error in the second virtual space (mirror) 52 and directly operating the virtual cooking robot in the second virtual space (mirror) 52.

5. Hardware Configuration Example

Figure 17:
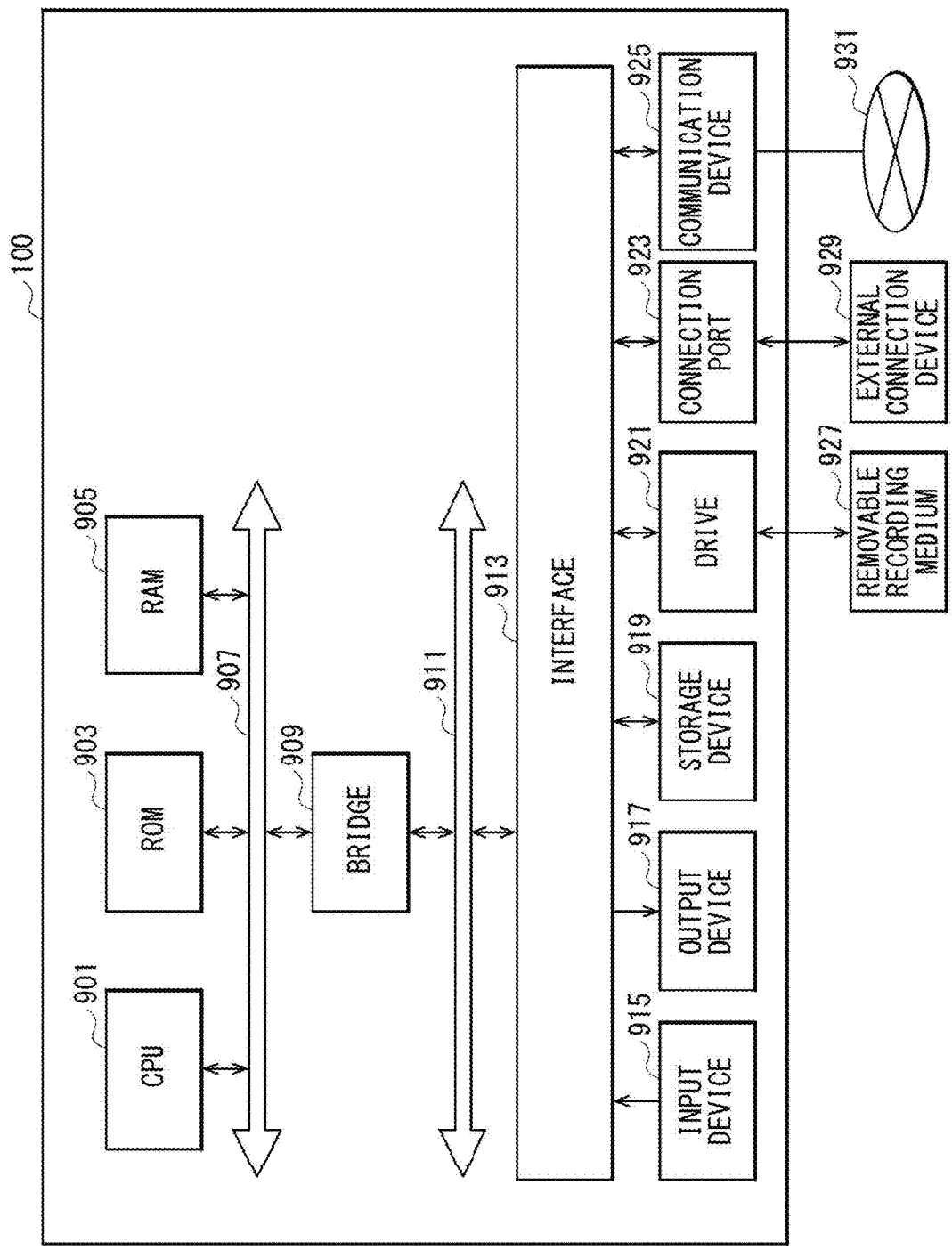
FIG. 17 is a block diagram illustrating a hardware configuration example of an information processing apparatus.

In addition, with reference to FIG. 17, a hardware configuration of the information processing apparatus 100 included in the cooking system according to the embodiments of the present embodiment will be described. FIG. 17 is a block diagram illustrating the hardware configuration example of the information processing apparatus 100.

Functions of the information processing apparatus 100 according to the present embodiments may be implemented in conjunction with software and hardware to be described below. Respective functions of the flavor presentation unit 110, the instruction generator 120, the converter 140, and the selector 160 may be executed by, for example, a CPU 901.

As illustrated in FIG. 17, the information processing apparatus 100 includes the CPU (Central Processing Unit) 901, a ROM (Read Only Memory) 903, and a RAM (Random Access Memory) 905.

Further, the information processing apparatus 100 may further include a host bus 907, a bridge 909, an external bus 911, an interface 913, an input device 915, an output device 917, a storage device 919, a drive 921, a connection port 923, or a communication device 925. Still further, the information processing apparatus 100 may include an imaging device 933 or a sensor 935, as necessary. The information processing apparatus 100 may also include a processing circuit such as a DSP (Digital Signal Processor) or an ASIC (Application Specific Integrated Circuit) instead of the CPU 901 or together with the CPU 901.

The CPU 901 functions as an arithmetic processing unit or a control unit and controls the operation in the information processing apparatus 100 according to various programs recorded in the ROM 903, the RAM 905, the storage device 919, or a removable recording medium 927. The ROM 903 stores programs and arithmetic parameters used by the CPU 901. The RAM 905 temporarily stores programs to be used in execution of the CPU 901 and parameters and the like to be used during the execution.

The CPU 901, the ROM 903, and the RAM 905 are coupled to each other via the host bus 907 including an internal bus such as a CPU bus or the like. In addition, the host bus 907 is coupled to the external bus 911 such as a PCI (Peripheral Component Interconnect/Interface) bus via the bridge 909.

The input device 915 is a device that accepts an input from a user, such as a mouse, a keyboard, a touch panel, a button, a switch, a lever, or an exoskeleton. The input device 915 may be a microphone or the like that detects a voice of the user. The input device 915 may be a remote control device using, for example, infrared light or other radio waves, or may be an external connection device 929 compatible with the operation of the information processing apparatus 100.

The input device 915 further includes an input control circuit that outputs an input signal generated on the basis of information inputted by the user to the CPU 901. The user inputs various kinds of data to the information processing apparatus 100 or instructs the information processing apparatus 100 to perform a processing operation by operating the input device 915.

The output device 917 is a device that is able to visually or aurally present to the user information acquired or generated by the information processing apparatus 100. The output device 917 may be, for example: a display device such as an LCD (Liquid Crystal Display), a PDP (Plasma Display Panel), an OLED (Organic Light Emitting Diode) display, a hologram display, a projector or a head mounted display; an audio output device such as a speaker or headphones; or a printing device such as a printer. The output device 917 is able to output information obtained by the processing performed by the information processing apparatus 100 as video in the form of text or an image, or as audio in the form of audio or sound.

The storage device 919 is a device for storing data configured as an example of a storage of the information processing apparatus 100. The storage device 919 may include, for example, a magnetic storage device such as an HDD (Hard Disk Drive), a semiconductor storage device, an optical storage device, or a magneto-optical storage device. The storage device 919 is able to store programs to be executed by the CPU 901, various kinds of data, and various kinds of data obtained from the outside.

The drive 921 is a reading device or a writing device for the removable recording medium 927 such as a magnetic disk, an optical disc, a magneto-optical disk, or a semiconductor memory, and is built in or externally attached to the information processing apparatus 100. For example, the drive 921 is able to read information recorded on the attached removable recording medium 927, and to output the information to the RAM 905. Further, the drive 921 is able to write the record on the attached removable recording medium 927.

The connection port 923 is a port for causing the external connection device 929 to be directly coupled to the information processing apparatus 100. Examples of the connection port 923 may include a USB (Universal Serial Bus) port, an IEEE1394 port, an SCSI (Small Computer System Interface) port, and the like. Further, other examples of the connection port 923 may include an RS-232C port, an optical audio terminal, an HDMI (registered trademark) (High-Definition Multimedia Interface) port, and the like. By coupling the external connection device 929 to the connection port 923, it becomes possible to transmit and receive various kinds of data between the information processing apparatus 100 and the external connection device 929.

The communication device 925 is a communication interface including, for example, a communication device for establishing a connection to a communication network 931. The communication device 925 may be, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like.

The communication device 925 is able to transmit and receive signals and the like using a predetermined protocol such as TCP/IP on the Internet and with other communication devices, for example. Further, the communication network 931 connected to the communication device 925 is a network and the like, which is connected via wire or wirelessly. The communication network 931 may be, for example, an Internet communication network, a home-use LAN, an infrared communication network, a radio wave communication network, a satellite communication network, or the like.

It is to be noted that, it is also possible to create a program for causing hardware such as the CPU 901, the ROM 903, or the RAM 905 built in a computer to exhibit substantially the same functions as the information processing apparatus 100 described above. Further, there may also be provided a computer-readable recording medium having the program recorded thereon.

The technology according to the present disclosure has been described with reference to the first to fourth embodiments and the modification examples. However, the technology according to the present disclosure is not limited to the foregoing embodiments, etc., and may be modified in a variety of ways.

In addition, not all of the configuration and the operation described in the above embodiments are indispensable as the configuration and the operation of the present disclosure. For example, among the components in the above-described embodiments, components not described in the independent claims indicating the most significant concepts of the present disclosure are to be understood as optional components.

The terms used throughout this specification and the appended claims should be construed as "non-limiting" terms. For example, the term "comprising" or "being comprised" should be construed as "not being limited to the mode recited as being comprised". The term "including" should be construed as "not being limited to the mode recited as being included".

The terms used herein are used merely for convenience of explanation and include terms that are not used to limit the configuration and operation. For example, the terms "right", "left", "top", "bottom", and the like each merely indicate a direction on the drawing being referred to. The terms "inner side" and "outer side" each merely indicate a direction toward the center of an element of interest and a direction away from the center of the element of interest, respectively. The same applies to terms similar to these terms and terms having similar meaning.

It is to be noted that the technology according to the present disclosure may have the following configurations. According to the technology of the present disclosure having the following configurations, it is possible for the user who is present in the first space to grasp the flavor of the cooking object that is present in the second space separated from the first space. Accordingly, the information processing apparatus and the cooking system of the present embodiment are able to present, to the user who operates a robot that is present at a remote location, more pieces of sense information than those sensed at the remote location. Effects according to the technology of the disclosure are not necessarily limited to those described herein. The present disclosure may further include any effects other than those described herein.

(1) An information processing apparatus including:
a flavor presentation unit that generates data for presenting, to a user who is present in a first space, a flavor of a cooking object that is present in a second space, the second space being separated from the first space; and an instruction generator that generates, on a basis of an input from the user, a control instruction for controlling an action of a cooking robot that is present in the second space.

(2)

The information processing apparatus according to (1), in which the cooking object includes an ingredient before entering a cooking process, the ingredient that is cooked in the cooking process, or a dish that is completed by going all the way through the cooking process.

(3)

The information processing apparatus according to (1) or (2), in which the flavor includes at least one or more of a taste, a scent, or a texture of the cooking object.

(4)

The information processing apparatus according to any one of (1) to (3), in which the flavor presentation unit generates data for reproducing the flavor and presenting the flavor to a sense of the user.

(5)

The information processing apparatus according to (4), in which the sense includes at least one or more of a taste sense, a smelling sense, or a tactile sense.

(6)

The information processing apparatus according to any one of (1) to (5), in which the flavor presentation unit generates data for visualizing the flavor and presenting the flavor to the user.

(7)

The information processing apparatus according to (6), in which the flavor presentation unit generates data for visualizing in a superimposed manner the flavor of the cooking object that is sensed and the flavor to be a target.

(8)

The information processing apparatus according to any one of (1) to (7), in which the instruction generator generates a first virtual space that simulates the second space on a side of the first space, and generates the control instruction for controlling the action of the cooking robot on a basis of an input performed by the user on the first virtual space.

(9)

The information processing apparatus according to any one of (1) to (8), in which the control instruction controls, on a basis of a sensing result with respect to the second space, the action of the cooking robot in a second virtual space, the second virtual space being generated on a side of the second space.

(10)

The information processing apparatus according to any one of (1) to (9), in which the input from the user includes an action instruction with respect to the cooking robot.

(11)

The information processing apparatus according to any one of (1) to (9), in which the input from the user includes data obtained by sensing a cooking action of the user.

(12)

The information processing apparatus according to any one of (1) to (11), in which the control instruction includes a current value, a target value, and a trajectory from the current value to the target value, in an operation space of the cooking robot.

(13)

The information processing apparatus according to (12), in which the control instruction further includes an intermediate value that is set between the current value and the target value.

(14)

The information processing apparatus according to any one of (1) to (13), in which the first space and the second space differ from each other in a disposition of objects, and the action of the cooking robot is controlled by the control instruction taking into consideration the difference in the disposition of the objects between the first space and the second space.

(15)

The information processing apparatus according to (14), in which the objects in the first space and the objects in the second space are correlated with each other in terms of respective meanings by performing image recognition on the objects.

(16)

The information processing apparatus according to (15), in which the instruction generator grasps a meaning of the input from the user, and generates the control instruction having a meaning corresponding to the meaning of the input.

(17)

The information processing apparatus according to any one of (1) to (16), in which the control instruction generated on a side of the first space is transmitted to the cooking robot that is present in the second space via a communication path.

(18)

The information processing apparatus according to (17), in which the first space and the second space are separated from each other by a distance that is greater than a distance causing a communication delay in the communication path.

(19)

A cooking system including:

a sensing unit that senses a flavor of a cooking object that is present in a second space;

a flavor presentation unit that generates data for presenting the sensed flavor of the cooking object to a user who is present in a first space, the first space being separated from the second space;

an instruction generator that generates a control instruction on a basis of an input from the user; and a cooking robot whose action is controlled on a basis of the control instruction, the cooking robot cooking the cooking object that is present in the second space.

This application claims the benefit of Japanese Priority Patent Application JP2020-188272 filed with the Japan Patent Office on Nov. 11, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing apparatus comprising:
processing circuitry configured to:

receive information related to a flavor of a cooking object that is present in a second space, the information related to the flavor of the cooking object based upon sensing in the second space;

generate data for presenting, to a user who is present in a first space, the flavor of the cooking object that is present in the second space on a basis of the information related to the flavor of the cooking object, the second space being separated from the first space; and generate, on a basis of an input from the user who is present in the first space and has been presented the flavor of the cooking object that is present in the second space on a basis of the data for presenting, a control instruction for controlling an action with respect to the cooking object of a cooking robot that is present in the second space, wherein the control instruction is transmitted to the cooking robot that is present in the second space via a communication path.

2. The information processing apparatus according to claim 1, wherein the cooking object includes an ingredient before entering a cooking process, the ingredient that is cooked in the cooking process, or a dish that is completed by going all the way through the cooking process.

3. The information processing apparatus according to claim 1, wherein the flavor of the cooking object includes at least one or more of a taste, a scent, and a texture.

4. The information processing apparatus according to claim 1, wherein the data for presenting includes data for reproducing the flavor of the cooking object and presenting the flavor of the cooking object to a sense of the user.

5. The information processing apparatus according to claim 4, wherein the sense includes at least one or more of a taste sense, a smelling sense, and a tactile sense.

6. The information processing apparatus according to claim 1, wherein the data for presenting includes data for visualizing the flavor of the cooking object and presenting the flavor of the cooking object to the user.

7. The information processing apparatus according to claim 6, wherein the data for presenting includes data for visualizing the flavor of the cooking object and a target flavor in a superimposed manner.

8. The information processing apparatus according to claim 1, wherein the processing circuitry is configured to:
generate a first virtual space that simulates the second space on a side of the first space, and

generate the control instruction for controlling the action with respect to the cooking object of the cooking robot on a basis of an input performed by the user on the first virtual space.

9. The information processing apparatus according to claim 1, wherein the control instruction controls the action with respect to the cooking object of the cooking robot in a second virtual space, the second virtual space being generated on a side of the second space.

10. The information processing apparatus according to claim 1, wherein the input from the user includes an action instruction with respect to the cooking robot.

11. The information processing apparatus according to claim 1, wherein the input from the user includes data obtained by sensing a cooking action of the user.

12. The information processing apparatus according to claim 1, wherein the control instruction includes a current value, a target value, and a trajectory from the current value to the target value in an operation space of the cooking robot.

13. The information processing apparatus according to claim 12, wherein the control instruction further includes an intermediate value that is set between the current value and the target value.

14. The information processing apparatus according to claim 1, wherein
the first space and the second space differ from each other in a disposition of objects, and the action with respect to the cooking object of the cooking robot is controlled by the control instruction taking into consideration the difference in the disposition of the objects between the first space and the second space.

15. The information processing apparatus according to claim 14, wherein the objects in the first space and the objects in the second space are correlated with each other in terms of respective meanings by performing image recognition on the objects.

16. The information processing apparatus according to claim 15, wherein the processing circuitry is configured to:
grasp a meaning of the input from the user, and
generate the control instruction having a meaning corresponding to the meaning of the input.

17. The information processing apparatus according to claim 1, wherein
the processing circuitry is configured to generate a second virtual space on a side of the second space when the first space and the second space are separated from each other by a distance causing a communication delay in the communication path, and
the control instruction controls the action with respect to the cooking object of the cooking robot in the second virtual space.

18. A cooking system comprising:
a sensor configured to sense a flavor of a cooking object that is present in a second space;
processing circuitry configured to:
receive information related to the flavor of the cooking object that is present in the second space, the information related to the flavor of the cooking object based upon the sensing of the sensor in the second space;
generate data for presenting the flavor of the cooking object that is present in the second space to a user who is present in a first space on a basis of the information related to the flavor of the cooking object, the first space being separated from the second space;
generate a control instruction for controlling an action with respect to the cooking object present in the second space on a basis of an input from the user who is present in the first space and has been presented the flavor of the cooking object that is present in the second space on a basis of the data for presenting; and
a cooking robot configured to be controlled on a basis of the control instruction, the cooking robot being present in the second space.

* * * * *